(12) United States Patent
Hottes et al.

(10) Patent No.: US 10,902,979 B2
(45) Date of Patent: Jan. 26, 2021

(54) METHOD AND APPARATUS FOR FABRICATING A SUSCEPTOR COIL ASSEMBLY RIBBON

(71) Applicant: The Boeing Company, Chicago, IL (US)

(72) Inventors: Christopher John Hottes, Seattle, WA (US); Jeffrey M. Hansen, Renton, WA (US); Charles M. Richards, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 869 days.

(21) Appl. No.: 14/870,531

(22) Filed: Sep. 30, 2015

(65) Prior Publication Data

US 2017/0094729 A1    Mar. 30, 2017

(51) Int. Cl.
| | |
|---|---|
| *B65H 49/32* | (2006.01) |
| *B65H 59/04* | (2006.01) |
| *B65H 57/12* | (2006.01) |
| *B65H 57/16* | (2006.01) |
| *B65H 59/38* | (2006.01) |
| *B29C 70/32* | (2006.01) |
| *B29L 31/30* | (2006.01) |
| *H01B 13/10* | (2006.01) |
| *B64C 1/00* | (2006.01) |

(Continued)

(52) U.S. Cl.
CPC .......... *H01B 13/103* (2013.01); *B29C 70/32* (2013.01); *B65H 49/32* (2013.01); *B65H 57/12* (2013.01); *B65H 57/16* (2013.01); *B65H 59/04* (2013.01); *B65H 59/385* (2013.01); *B29C 33/02* (2013.01); *B29L 2031/3076* (2013.01); *B64C 2001/0072* (2013.01); *B64F 5/40* (2017.01); *B65H 2301/4148* (2013.01); *H01B 7/0838* (2013.01)

(58) Field of Classification Search
CPC .. H01B 13/103; H01B 13/106; H01B 7/0838; B65H 59/04; B65H 59/384; B65H 59/385
See application file for complete search history.

(56) References Cited

U.S. PATENT DOCUMENTS

| 2,785,021 A | * | 3/1957 | Whittum | ............. | D21G 1/0026 |
|---|---|---|---|---|---|
| | | | | | 384/256 |
| 3,459,609 A | * | 8/1969 | Hairabedian | ........ | H01B 7/0838 |
| | | | | | 156/179 |

(Continued)

OTHER PUBLICATIONS

U.S. Appl. No. 14/870,434, filed Sep. 30, 2015.

(Continued)

*Primary Examiner* — Livius R. Cazan
(74) *Attorney, Agent, or Firm* — McDonnell Boehnen Hulbert & Berghoff LLP

(57) ABSTRACT

A method and system for fabricating a susceptor coil assembly ribbon. An apparatus comprising a tensioning section 100 that provides a predetermined amount of tension to a plurality of susceptor coil assemblies 20, a collimating section 200 that receives the plurality of susceptor coil assemblies 20 from the tensioning section 100 and aligns the plurality of susceptor coil assemblies 20. An impaling section 300 receives the plurality of susceptor coil assemblies 20 aligned by the collimating section 200 and impales the plurality of susceptor coil assemblies 20 into a matrix material 320 so as to fabricate a susceptor coil assembly ribbon 30.

20 Claims, 18 Drawing Sheets

(51) Int. Cl.
*B29C 33/02* (2006.01)
*B64F 5/40* (2017.01)
*H01B 7/08* (2006.01)

(56) References Cited

U.S. PATENT DOCUMENTS

| | | | | |
|---|---|---|---|---|
| 3,523,844 A | * | 8/1970 | Crimmins et al. | H01B 7/0838 156/52 |
| 3,802,974 A | * | 4/1974 | Emmel | H01B 7/0838 156/55 |
| 3,910,521 A | * | 10/1975 | O'Callaghan | B65H 23/1806 242/413.9 |
| 4,178,670 A | * | 12/1979 | Schmid | B23P 15/28 29/417 |
| 5,200,391 A | * | 4/1993 | Fisher | H01L 39/143 228/179.1 |
| 8,330,086 B2 | | 12/2012 | Miller et al. | |
| 2012/0145702 A1 | | 6/2012 | Miller et al. | |

OTHER PUBLICATIONS

U.S. Appl. No. 14/640,227, filed Mar. 16, 2015.
U.S. Appl. No. 14/640,217, filed Mar. 6, 2015.
U.S. Appl. No. 14/640,234, filed Mar. 6, 2015.

\* cited by examiner

METHOD AND APPARATUS FOR FABRICATING A SUSCEPTOR COIL ASSEMBLY RIBBON

FIELD

The present disclosure relates generally to susceptors for use with heating blankets. More particularly, the present disclosure relates to methods and apparatus for fabricating a susceptor coil assembly ribbon wherein the ribbon comprises a plurality of susceptor coil assemblies.

BACKGROUND

A composite part may be bonded or cured in an oven or an autoclave where heat is applied to the part while supported on a cure tool that maintains the shape of the part during the curing process. Techniques have been developed for curing composite parts without the need for an oven or autoclave. However, these techniques have been limited to curing relatively small, simple parts and/or require relatively complicated and/or expensive tooling. Recently, curing of relatively small composite parts has been achieved using induction heating equipment employing ferromagnetic susceptors that produce a maximum, constant temperature when inductively heated. For example, heating blankets using inductively heated susceptors have been used to cure relatively small areas of a composite rework patch applied to a structure such as an aircraft skin.

In certain known heating blankets, the blankets are constructed by threading springs of susceptor wire onto a length of a conductor wire that is designed for carrying high frequency current, commonly referred to in the art as a Litz wire. When threading the susceptor wire onto the conductor wire, it is generally desired to orient the susceptor wire as near to perpendicular as possible to the direction of current flow in the Litz wire. A near perpendicular orientation is desired so as to maximize the induced magnetic fields into the susceptor wire which creates heat by virtue of eddy currents created by the wire. By using springs (i.e., preformed or wrapped onto the Litz wire), the susceptor can be oriented along the Litz wire in order to capitalize on a high density of susceptor per unit length of the Litz wire and keep the susceptor wire in the region of highest magnetic field strength (i.e., as close to orthogonal to the direction of current flow within the Litz wire).

This threaded spring configuration has been shown to produce suitable results for certain heating blanket applications, but also has demonstrated certain limitations. For example, in such spring configurations, a large amount of Litz wire is typically required to carry the appropriate amount of current for large heating blankets. In addition, a large amount of Litz wire is typically also required to maintain an applied voltage within certain safety levels, and also to produce the required amount of heat. Therefore, the spring threaded configurations do not lend themselves to providing a practical heating blanket for large heating or curing applications. Moreover, is has been proven difficult to keep the susceptor springs from tangling with one another within the heating blanket. In addition, susceptor springs were not cost effective for large sized heating blankets.

Accordingly, there is a need for cost effective methods and devices that can be utilized to fabricate susceptor based heating blankets while customizing such blankets so as to achieve desired heating profiles, especially for heating large composite structures.

SUMMARY

According to an exemplary embodiment, an apparatus 10 for fabricating a susceptor coil assembly ribbon 30 is disclosed. The apparatus 10 comprising a tensioning section 100 that provides a predetermined amount of tension to a plurality of susceptor coil assemblies 20, a collimating section 200 that receives the plurality of susceptor coil assemblies 20 from the tensioning section 100 and aligns the plurality of susceptor coil assemblies 20 and an impaling section 300 that receives the plurality of susceptor coil assemblies 20 aligned by the collimating section 200 and impales the plurality of susceptor coil assemblies 20 into a matrix material 320 so as to fabricate a susceptor coil assembly ribbon 30.

In an exemplary arrangement, the apparatus 10 further comprises a take up section 400 for receiving the susceptor coil assembly ribbon 30 from the impaling section 300, the take up section 400 winding the susceptor coil assembly ribbon 30 onto a take up spool 450.

In an exemplary arrangement, the take up section 400 comprises a programmable drive system 460 that is programmable to operate a take up motor 470, preferably a smart motor 475. The take up motor 470 is operable to pull the plurality of susceptor coil assemblies 20 from the tensioning section 100 through the impaling section 300.

In an exemplary arrangement, the tensioning section 100 comprises a plurality of spools 130 wherein each of the plurality of spools 130 is wound with a length of one of the plurality of susceptor coil assemblies 20. In an exemplary arrangement, at least one of the plurality of spools 130 is mounted to an adjustable drag member 150. In an exemplary arrangement, the adjustable drag member 150 comprises a slip-clutch mechanism 160. The slip-clutch mechanism 160 allows the length of the at least one of the plurality of susceptor coil assemblies wound on the spool to slip as the plurality of susceptor coil assemblies 30 are pulled from the tensioning section 100 towards the impaling section 300.

In an exemplary arrangement, the collimating section 200 comprises a multi-grooved aligning member 215. The aligning member 215 comprising a plurality of grooves 240 that are configured to align the plurality of susceptor coil assemblies 120 as the plurality of susceptor coil assemblies 120 are pulled from the tensioning section 100 and into the impaling section 300.

In an exemplary arrangement, the impaling section 300 comprises a plurality of pinch rollers 340 that receive the plurality of susceptor coil assemblies 20 aligned by the collimating section 200 and that impales the plurality of susceptor coil assemblies 20 into the matrix material 320 so as to fabricate the susceptor coil assembly ribbon 30.

In an exemplary arrangement, the plurality of pinch rollers 340 impales the plurality of susceptor coil assemblies 20 into the matrix material 320 so as to fabricate the susceptor coil assembly ribbon 30. Preferably, the susceptor coil assembly ribbon 30 comprises a pre-determined depth 35.

In an exemplary arrangement, the apparatus 10 further comprises at least a first matrix material source 324. In another exemplary arrangement, the apparatus 10 further comprises at least a first matrix material source 324 and a second matrix material source 328.

In an exemplary arrangement, the impaling section 300 that receives the plurality of susceptor coil assemblies 20 aligned by the collimating section 200, impales the plurality of susceptor coil assemblies 20 into at least one layer of the matrix material 320 so as to fabricate a susceptor coil assembly ribbon 30.

In an exemplary arrangement, the apparatus comprises a slitting section 500 that receives the susceptor coil assembly ribbon 30 from the impaling section 300 and slits the susceptor coil assembly ribbon 30 to a desired susceptor coil assembly width 40.

In an exemplary arrangement, a method for fabricating a susceptor coil assembly ribbon 30 is disclosed. The method comprising the steps of pulling a plurality of susceptor coil assemblies 20 from a tensioning section 100 towards a collimating section 300. The method includes the steps of collimating the plurality of susceptor coil assemblies 20 as the plurality of susceptor coil assemblies 20 are pulled from the tensioning section 100 towards a collimating section 200 so as to align the plurality of susceptor coil assemblies 20 and impaling the plurality of susceptor coil assemblies 20 into a matrix material 320 so as to fabricate a susceptor coil assembly ribbon 30.

In an exemplary arrangement, the method further comprises the step of receiving the susceptor coil assembly ribbon 30 from the impaling section 300 by a take up section 400, the take up section 400 comprising a take up spool 450 and winding the susceptor coil assembly ribbon 30 onto the take up spool 450.

In an exemplary arrangement, the method further comprises the step of utilizing a programmable drive system 460 to pull the plurality of susceptor coil assemblies 20 from the tensioning section 100 through the impaling section 300, the programmable drive system 460 is programmable to operate a take up motor 470.

In an exemplary arrangement, the method further comprises the step of utilizing a multi-grooved aligning member 215 comprising a plurality of grooves 240 to align the plurality of susceptor coil assemblies 20 as the plurality of susceptor coil assemblies 20 are pulled from the tensioning section 100 and into the impaling section 300.

In an exemplary arrangement, the method further comprises the step of maintaining a desired tension in the plurality of susceptor coil assemblies 20 as the plurality of susceptor coil assemblies 20 are pulled from the tensioning section 100 towards the collimating section 200.

In an exemplary arrangement, the step of impaling the plurality of susceptor coil assemblies 20 into a matrix material 320 so as to fabricate a susceptor coil assembly ribbon 30 comprises the step of impaling the plurality of susceptor coil assemblies 20 into at least one layer of the matrix material 320 so as to fabricate a susceptor coil assembly ribbon 30.

In an exemplary arrangement, the method further comprises the step of winding the susceptor coil assembly ribbon 30 onto a take up spool 450.

In an exemplary arrangement, the method further comprises the step of slitting the susceptor coil assembly ribbon 30 to a desired susceptor coil assembly ribbon width 40.

These as well as other advantages of various aspects of the present patent application will become apparent to those of ordinary skill in the art by reading the following detailed description, with appropriate reference to the accompanying drawings.

BRIEF DESCRIPTION OF THE DRAWINGS

The novel features believed characteristic of the illustrative embodiments are set forth in the appended claims. The illustrative embodiments, however, as well as a preferred mode of use, further structures and descriptions thereof, will best be understood by reference to the following detailed description of an illustrative embodiment of the present disclosure when read in conjunction with the accompanying drawings, wherein:

DETAILED DESCRIPTION

Figure 1:
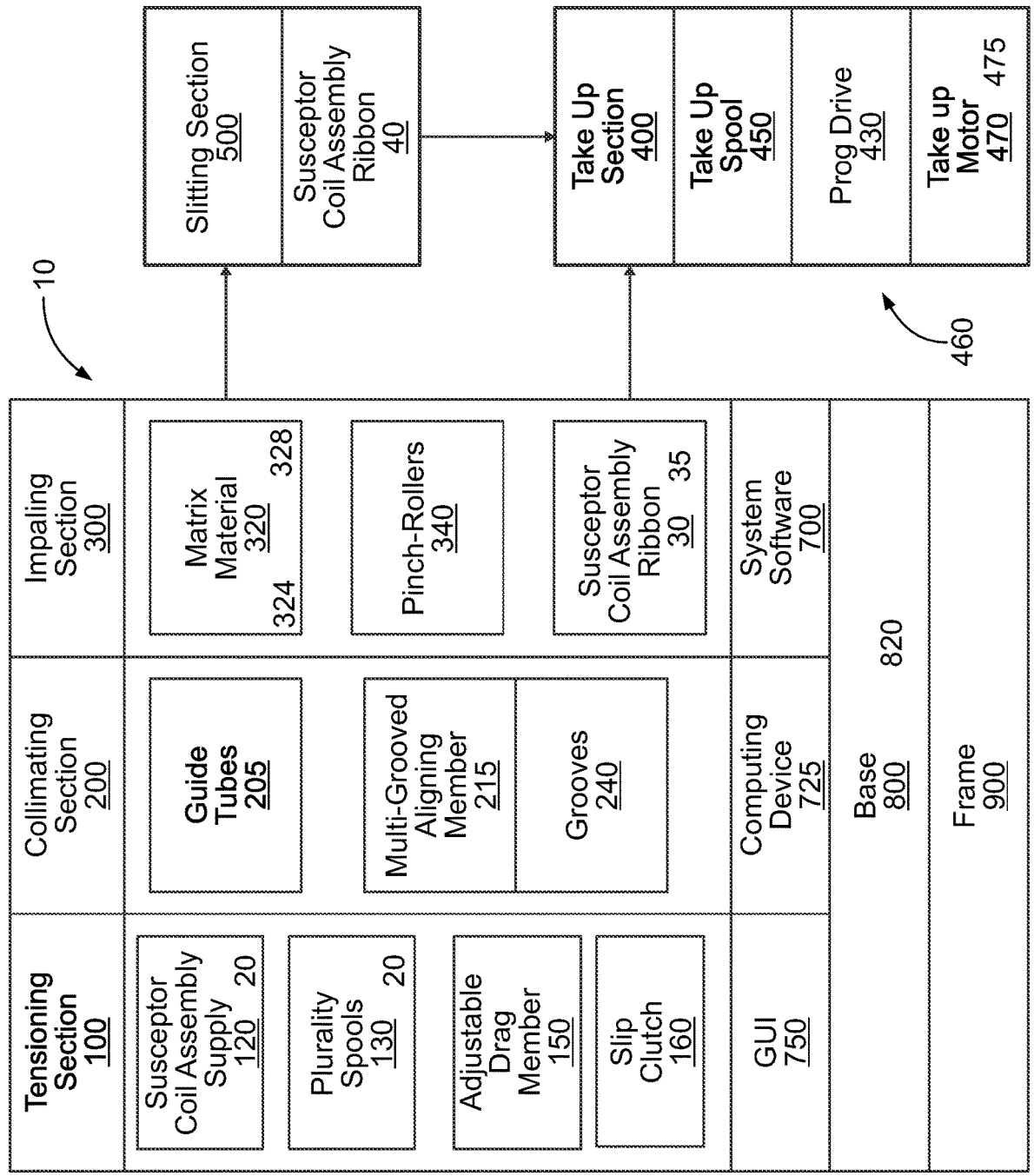
FIG. 1 is a diagrammatic representation of a functional block diagram of a apparatus for fabricating a susceptor coil assembly ribbon according to disclosed embodiments.

FIG. 1 is a diagrammatic representation of a functional block diagram of an apparatus 10 for fabricating a susceptor coil assembly ribbon 30 according to disclosed embodiments. As will be described in greater detail herein, the susceptor coil assembly ribbon 30 comprises a plurality of susceptor coil assemblies 20 (i.e., a smart susceptor that is wound or coiled generally perpendicularly along an outer surface of a conductor wire where the wound coils reside perpendicular to a longitudinal axis of the conductor wire e.g., a Litz wire). For example, corresponding patent disclosure entitled "Method and Apparatus For Fabricating Susceptor Coil Assemblies," filed simultaneously along with the present disclosure, generally describes methods and apparatus for fabricating such susceptor coil assemblies. This corresponding patent disclosure is herein entirely incorporated by reference and to which the reader is directed for further information. The disclosed apparatus 10 impales (i.e., imbeds) the plurality of susceptor coil assemblies 20 within a matrix material 320 (e.g., a B-stage silicon rubber) to thereby fabricate the susceptor coil assembly ribbon 30.

Figure 2:
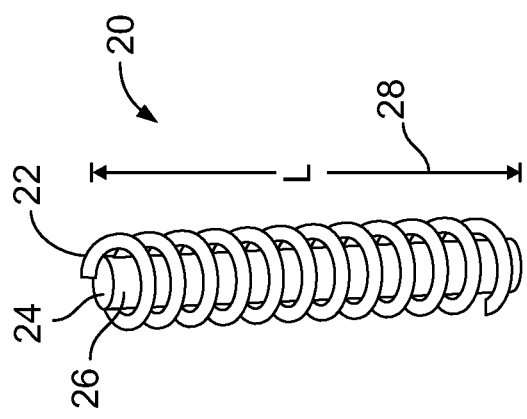
FIG. 2 is a diagrammatic representation of a susceptor coil assembly that may be utilized by an apparatus to fabricate a susceptor coil assembly ribbon, such as the apparatus represented by the functional block diagram of FIG. 1.

For example, an exemplary susceptor coil assembly 20 is illustrated in FIG. 2. A plurality of such susceptor coil assemblies 20 may be embedded within one or more layers of a matrix material 320 so as to form a susceptor coil assembly ribbon 30. The ribbon 30 may then be slit to a desired ribbon width 40 and then the ribbon 30 may be wound by a take up section 400. Optionally, the ribbon 30 and its matrix material 320 may then be heated and cured. The cured ribbon 30 may then be used in for a range of heating applications, such as a heating blanket for heating composite structures.

In this illustrated susceptor coil assembly 20 of FIG. 2, the assembly 20 comprises a spring or coil shaped susceptor 22 that is wound around an outer surface 26 of a conductor wire 24 as described in Applicants' related application entitled "Method and Apparatus For Fabricating Susceptor Coil Assemblies," previously herein entirely incorporated by reference. In one preferred arrangement, the conductor wire 24 comprises a Litz wire. As will be described in greater detail herein, the apparatus 10 illustrated in FIG. 1 can be used to fabricate a susceptor coil assembly ribbon 30 wherein the number and/or the type of susceptor coil assemblies 20 can be varied so as to fabricate a diverse variety of susceptor coil assembly ribbon 30 arrangements. As just one example, the susceptor coil assembly 20 illustrated in FIG. 2 comprises a total number of 12 turns of the susceptor wire 21 that are provided along a length L 28 of the conductor wire 24. One advantage of the presently disclosed apparatus and/or methods is that the apparatus can be utilized to fabricate a susceptor coil assembly ribbon 30 comprising from about 10 to about 100 susceptor coil assemblies 20 impaled within at least one matrix material 320.

Returning to FIG. 1, as illustrated, the apparatus 10 for fabricating a susceptor coil assembly ribbon 30 comprises three processing sections: a tensioning section 100, a collimating section 200, and an impaling section 300. Optionally, the apparatus 10 may include a slitting section 500. The slitting section 500 can be operated to slit the fabricated ribbon 30 to a desired ribbon width 40. In addition, take up section 400 may be used to wind the ribbon 30 that it receives from either the slitting section 500 or from the impaling section 300. In one arrangement, the take up section 400 winds the ribbon 30 onto a take up spool 450.

One or more of the apparatus sections 100, 200, 300, 400, and 500 may be operated and/or controlled by way of computing device 725.

The tensioning section 100 comprises a susceptor coil assembly supply 120. Such a supply 120 may comprise a plurality of susceptor coil assemblies 20. In one arrangement, the susceptor coil assemblies 20 of the susceptor coil assembly supply 120 are provided by way of a plurality of spools 130. In such an arrangement, each of the plurality of spools 130 is provided with a length of a susceptor coil assembly 20. As just one example, the tensioning section 100 may comprise up to 50 or more spools 130, with each spool 130 wound with a length of susceptor coil assembly 20.

Preferably, the tensioning section 100 maintains a desired tension in each of the plurality of susceptor coil assemblies 20 as the plurality of susceptor coil assemblies 20 are pulled from the tensioning section 100, through the collimating section 200, and into the impaling section 300. The take up section 400 may draw or pull the susceptor coil assembly ribbon 30 from the impaling section 300. Alternatively, where a slitting section 500 is utilized, the take up section 400 may draw the susceptor coil assembly ribbon 30 from the slitting section 500.

The tensioning section 100 further comprises a plurality of adjustable drag members 150. Preferably, each adjustable drag member 150 comprises a spool 130 of susceptor coil assembly 20. In an exemplary arrangement, at least one of the plurality of spools 130 is mounted to an adjustable drag member 150. In an exemplary arrangement, the adjustable drag member 150 comprises a variable slip or friction clutch mechanism 160. This type of slip clutch mechanism 160 allows the length of the at least one of the plurality of susceptor coil assemblies 20 wound on the spool 130 to slip as the plurality of susceptor coil assemblies 20 are pulled from the tensioning section 100 towards the impaling section 500. As such, the amount of tension in each susceptor coil assembly 20 can be independently set by way of the adjustable drag member 150.

A programmable drive system 460 is programmable to operate a programmable drive 430 and a take up motor 470 to achieve a desired feed rate of the plurality of susceptor coil assemblies 20 from the tensioning section 100 to the impaling section 300. Preferably, the take up motor 470 comprises a smart motor 475 such as an induction motor comprising an integral encoder that provides position shaft position feedback to the system software 700. In one preferred arrangement, the programmable drive system 460 may be operated and controlled by way of a computing device 725 running the system software 700.

The tensioning section 100, the collimating section 200, the impaling section 300, and the take up section 400 may all be operated by way of the computing device 725 wherein the system software 700 may be accessible by way of a graphical user interface 750 (i.e., GUI). As just one example, the system software 700 may comprise a G-code logic system software provided by Moog Animatics. As will be explained in greater detail herein, the apparatus 10 comprises a programmable drive system 460 that may be operated so as to fabricate a susceptor coil assembly ribbon 30 comprising a plurality of susceptor coil assemblies 20 (such as the susceptor coil assembly 20 illustrated in FIG. 2) that are impaled into a matrix material 320 (e.g., one or more layers of matrix material).

In one preferred arrangement, the various sections 100, 200, 300 of the apparatus 10 are supported along a portion of a top surface 820 of a base 800 for support of the various components. In one preferred arrangement, the base 800 of the apparatus 10 is further supported by an apparatus frame 900.

In this illustrated embodiment of apparatus 10, the tensioning section 100 comprises a susceptor coil assembly supply 120 for supplying a plurality of susceptor coil assemblies 20 to the collimating section 200. Preferably, the tensioning section 100 simultaneously provides the plurality of susceptor coil assemblies 20 into the collimating section 200 at a predetermined rate or feed rate. As will be described in greater detail herein, the take up section 400 utilizes the programmable drive system 460 to control a take up motor 470 that turns the take up spool 450 in a controlled manner. As the take up spool 450 is turned in a controlled manner, the ribbon 30 (and therefore the plurality of susceptor coil assemblies 20 making up the ribbon 30) are pulled from the tensioning section 100, into the collimating section 200, and then through the impaling section 300. Preferably, the programmable drive system 460 is operated and controlled by the system software 700 and whose operating settings may be accessible by way of the graphical user interface 750.

The apparatus 10 further includes the collimating section 200 which resides downstream of the tensioning section 100. The collimating section 200 comprises a multi-grooved aligning member 215 that receives the plurality of susceptor coil assemblies 20 from the tensioning section 100. The multi-grooved aligning member 215 aligns the plurality of susceptor coil assemblies 20 as the plurality of assemblies 20 are channeled through a plurality of grooves 240 defined by the multi-grooved aligning member 215. After the plurality of susceptor coil assemblies 20 are aligned, the assemblies 20 enter the impaling section 300. Aside from receiving the now aligned plurality of susceptor coil assemblies 20, the impaling section 300 also receives a matrix material 320. In one preferred arrangement, the impaling section 300 receives matrix material 320 from a first matrix material source 324 and a second matrix material source 328. In an alternative arrangement, the impaling section 300 receives matrix material 320 from only a first matrix material source 324. Alternative matrix source arrangements may also be used.

The plurality of pinch rollers 340 are configured to receive the matrix material 320 and the plurality of susceptor coil assemblies 20. As the matrix material 320 and the plurality of susceptor coil assemblies 20 are pulled through the pinch rollers 340 by operation of the take up motor 470, the plurality of susceptor coil assemblies 20 are impaled or embedded into the matrix material 320 as both the plurality of susceptor coil assemblies 20 and the matrix material 320 are pinched between the pinch rollers 340. Consequently, a susceptor coil assembly ribbon 30 is fabricated. Preferably, the ribbon 30 is fabricated comprising a desired ribbon depth 35. In one preferred arrangement, the desired ribbon depth 35 is determined by an adjustable distance between an outer surface 362 of a first pinch roller 360 and an outer surface 372 of a second pinch roller 370. As such, the impaling section 300 produces a susceptor coil assembly ribbon 30 comprising a predetermined depth 35.

In one arrangement, a slitting section 500 is positioned downstream of the impaling section 300 and receives the fabricated susceptor coil assembly ribbon 30 from the impaling section 300. The slitting section 500 is operated to slit the ribbon 30 to a desired ribbon width 40. The ribbon 30 comprising a desired or predetermined width 40 may then be provided to the take up section 400 where the ribbon 30 is then wound up on a take up spool 450.

Alternatively, the take up section 400 is positioned downstream of the impaling section 300 and receives the fabricated susceptor coil assembly ribbon 30 directly from the impaling section 300.

The take up section 400 comprises a take up spool 450 and a programmable drive system 460. The programmable drive system 460 comprises a programmable drive 430 and a take up motor 470. By way of a programmable drive system 460, the tensioning section 100 is programmed by way of a graphical user interface 750 provided by a computing device 725 so as to maintain a desired speed of the plurality of susceptor coil assemblies 20 as these coil assemblies 20 are pulled from the tensioning section 100 through the collimating section 200 and towards the impaling section 300.

Figure 3:
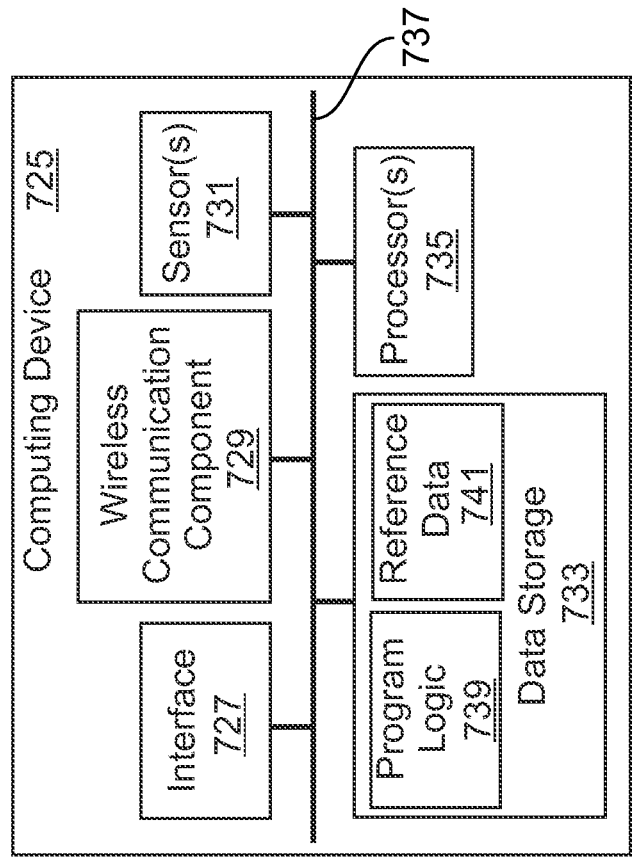
FIG. 3 is a diagrammatic representation of an example computing device, according to one embodiment.

FIG. 3 illustrates a schematic drawing of an example computing device 725. The computing device 725 illustrated in FIG. 3 may represent the computing device 725 for use with the apparatus 10 illustrated in FIG. 1. In some examples, components illustrated in FIG. 3 may be distributed across multiple computing devices. However, for the sake of example, the components are shown and described as part of one example computing device 725.

The computing device 725 may include an interface 727, a wireless communication component 729, sensor(s) 731, data storage 733, and a processor 735. Components illustrated in FIG. 3 may be linked together by a communication link 737. The computing device 725 may also include hardware to enable communication between the computing device 725 and another computing device (not shown), such as a server entity. The hardware may include transmitters, receivers, and antennas, for example.

The interface 727 may be configured to allow the computing device 725 to communicate with another computing device (not shown), such as a server or land-based device. Thus, the interface 727 may be configured to receive input data from one or more computing devices, and may also be configured to send output data to the one or more computing devices. In some examples, the interface 727 may also maintain and manage records of data received and sent by the computing device 725. The interface 727 may also include a receiver and transmitter to receive and send data.

The wireless communication component 729 may be a communication interface that is configured to facilitate wireless data communication for the computing device 725 according to one or more wireless communication standards. For example, the wireless communication component 729 may include a Wi-Fi communication component, or a cellular communication component. Other examples are also possible, such as proprietary wireless communication devices.

The sensor(s) 731 may include one or more sensors, or may represent one or more sensors included within the computing device 725. Example sensors may include one or more encoders, one or more accelerometers, one or more magnetometers, one or more optical sensors, and/or one or more infrared sensors, or any other similar type sensors may be incorporated into the computing device 725. The sensors 731 may more generally include sensors for detecting the position of the susceptor coil assemblies, the feed rates of the coil assemblies and/or the matrix material, the torque characteristics and/or shaft speed of motor 450, and/or the linear speed of the ribbon 30 and its various components. The sensors 731 may also be used to track and monitor how much ribbon 30 has been wound on the take up spool 450.

The processor 735 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a computing device, a micro-computing device, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The data storage 733 may contain program logic 739 and reference data 741. Reference data 741 is configured to store, maintain, and provide data as needed to support the functionality of the system. For example, the reference data 741 may comprise the type of smart susceptor used to fabricate the coil assemblies, the amount of drag provided by the plurality of adjustable drag members 150, the type of Litz wire used, the turns per unit length of Litz wire, the size of the coil assemblies, the length of the susceptor coil assemblies 20, and/or other types of operating data. Program logic 739, in turn, may then comprise machine language instructions or the like that are executable by the processor 735 to carry out various functions described herein.

In practical embodiments, the data storage 733 may comprise, for example but without limitation, a non-volatile storage device (non-volatile semiconductor memory, hard disk device, optical disk device, and the like), a random access storage device (for example, SRAM, DRAM), or any other form of storage medium known in the art.

The data storage 733 may be coupled to the processor 735 and configured to store, for example but without limitation, a database, and the like. Additionally, the data storage 733 may represent a dynamically updating database containing a table for updating the database, and the like. The data storage 733 may be coupled to the processor 735 such that the processor 735 can read information from and write information to the data storage 733. For example, the processor 735 may access the data storage 733 to access a predetermined tension, a linear speed, a desired motor speed, tensioning section information, impaling section information, slitting section information, take up section information, or other data.

As an example, the processor 735 and data storage 733 may reside in respective application specific integrated circuits (ASICs). The data storage 733 may also be integrated into the processor 735. In an embodiment, the data storage 733 may comprise a cache memory for storing temporary variables or other intermediate information during execution of instructions to be executed by the processor 735.

Figure 4:
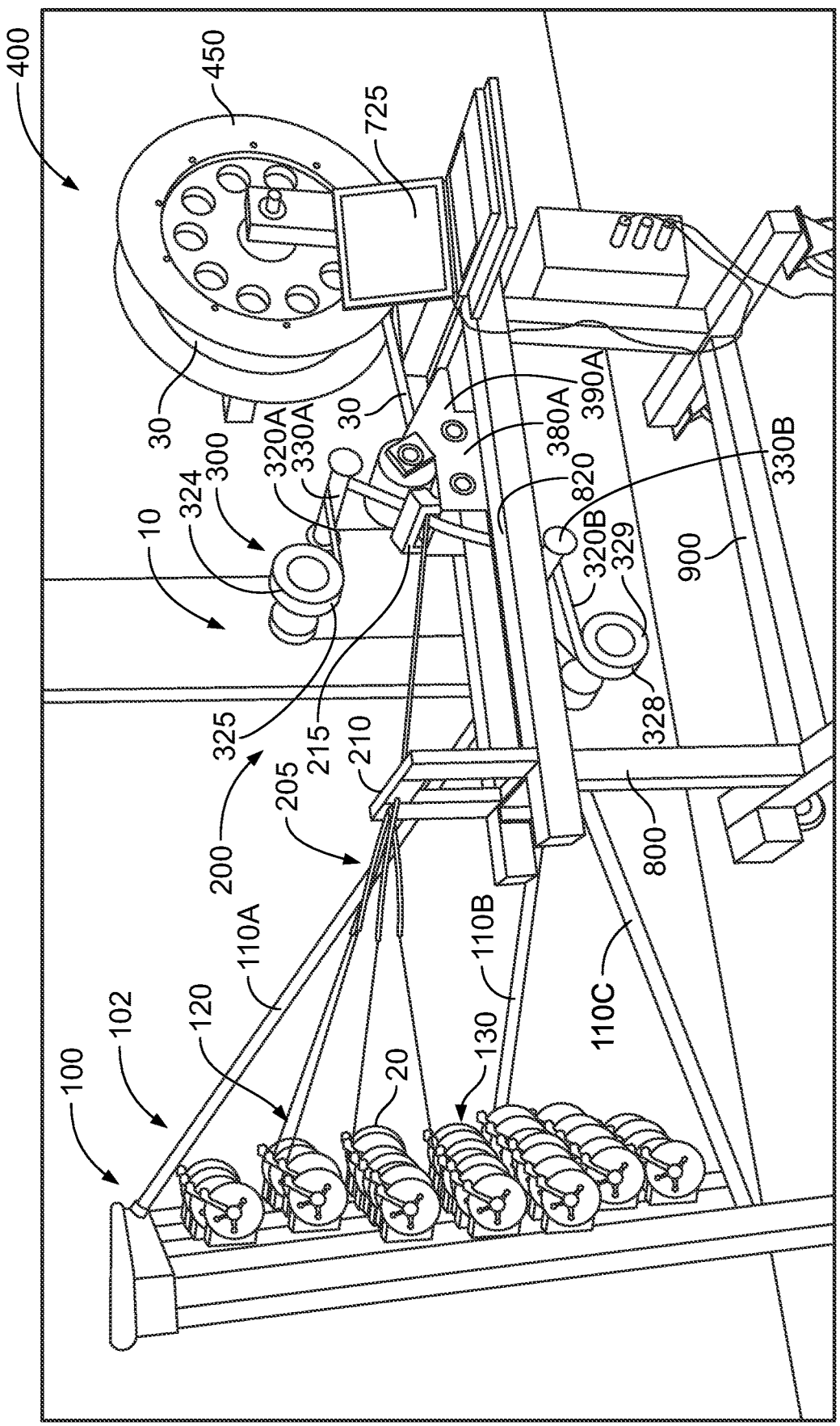
FIG. 4 is a diagrammatic representation of an apparatus for fabricating a susceptor coil assembly ribbon according to disclosed embodiments.

FIG. 4 is a diagrammatic representation of an apparatus 10 for fabricating a susceptor coil assembly ribbon 30 according to disclosed embodiments, similar in operation to the apparatus 10 illustrated in FIG. 1. For example, similar to the apparatus 10 illustrated in FIG. 1, the apparatus 10 illustrated in FIG. 4 may be used for fabricating a susceptor coil assembly ribbon 30. As illustrated, the apparatus 10 for fabricating a susceptor coil assembly ribbon 30 comprises three processing sections: a tensioning section 100, a collimating section 200, and an impaling section 300. Optionally, the apparatus 10 may include a slitting section 500 (not shown). The slitting section 500 can be operated to slit the fabricated ribbon 30 to a desired width 40. In addition, a take up section 400 may be used to wind the fabricated ribbon 30 that is received from either the slitting section 500 or from the impaling section 300. In one arrangement, the take up section 400 winds the ribbon 30 onto a take up spool 450.

Each of the apparatus sections 100, 200, 300, 400, and 500 may be operated and/or controlled by way of computing device 725 as herein described. In one preferred arrangement, the various sections 100, 200, 300 of the apparatus 10 are supported along a top surface 820 of a base 800 portion for support the various components. In one preferred arrangement, the base 800 of the apparatus 10 is further supported by an apparatus frame 900.

The tensioning section 100 comprises a susceptor coil assembly supply 120. In this illustrated arrangement, susceptor coil assembly supply 120 comprises a plurality of susceptor coil assemblies 20 wound around a plurality of spools 130. In this arrangement, each spool 130 is provided with a length of a susceptor coil assembly 20. In one arrangement, each susceptor coil assembly 20 within the susceptor coil assembly supply 120 comprises the same type of susceptor coil assembly 20 (i.e., the same type of susceptor wire 22 wrapped around the outer surface 26 of the conductor wire 24 and using the same number of wraps per inch).

However, in an alternative arrangement, the susceptor coil assembly supply 120 may comprise different types of susceptor coil assemblies 20 (i.e., different types of susceptor wire 22 wrapped around different types of conductor wire 24, and perhaps using a higher and/or lower number of wraps per inch). In such an alternative arrangement, a layout of an anticipated heating blanket and the heating blanket's heat producing requirements might dictate what type of susceptor coil assemblies 20 are to be provided to the plurality of spools 130 of the tensioning section 100. A layout of an anticipated heating blanket and the heating blanket's heat producing requirements might also dictate how many of the plurality of spools 130 of the tensioning section 100 are used during susceptor coil assembly ribbon 30 fabrication.

Figure 5:
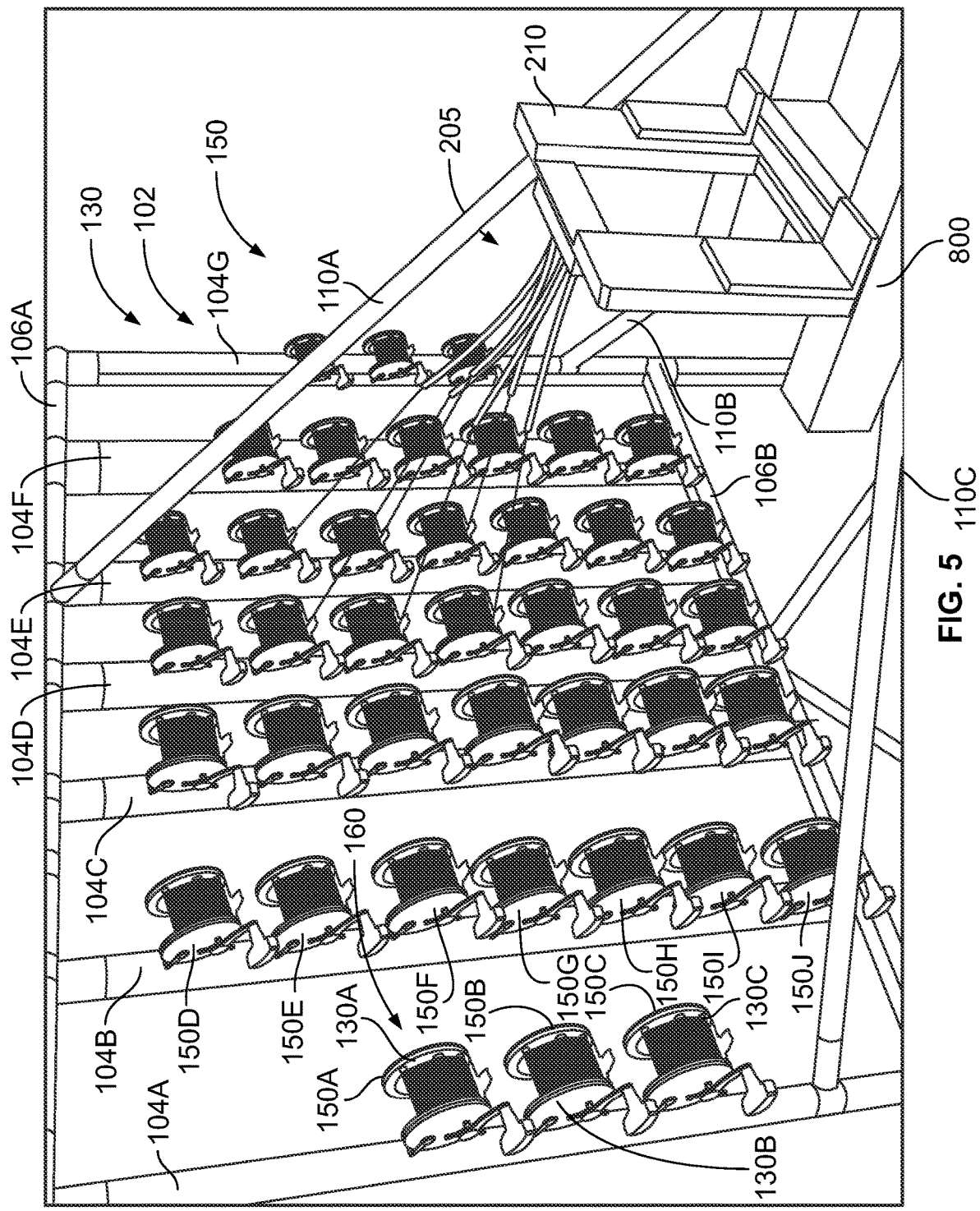
FIG. 5 a diagrammatic representation of a tensioning section of the apparatus of FIG. 4.
Figure 6:
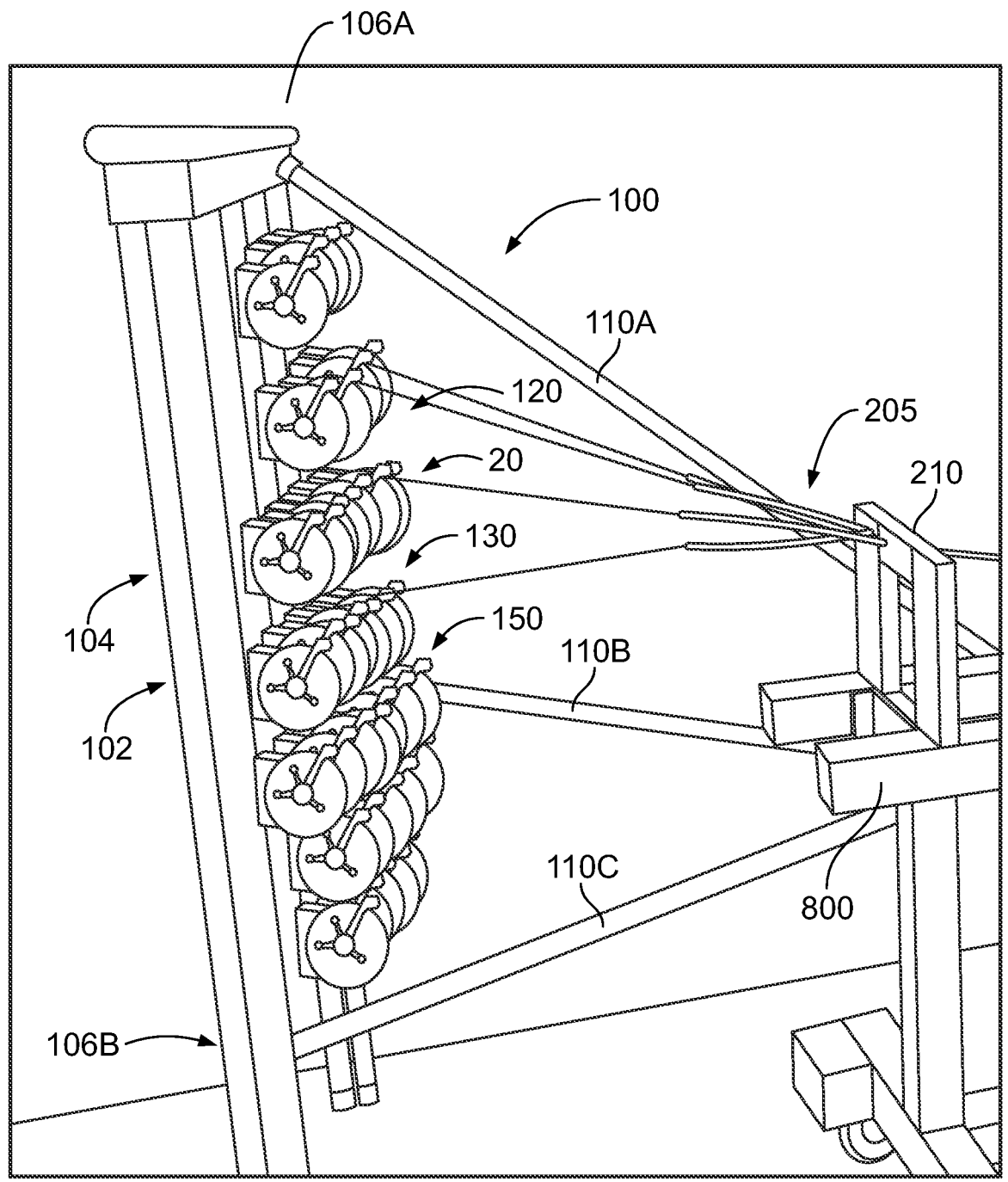
FIG. 6 is another diagrammatic representation of a tensioning section of the apparatus of FIG. 4.

FIG. 5 a diagrammatic representation of a tensioning section 100 of the apparatus of FIG. 4. FIG. 6 is another diagrammatic representation of a tensioning section 100 of the apparatus 10 of FIG. 4. Referring now to both FIGS. 5 and 6, in this illustrated arrangement, the tensioning section 100 comprises up to fifty (50) or more spools 130 of susceptor coil assemblies 20 that are mounted on a tensioning section frame 102. Specifically, the tensioning section frame 102 comprises a plurality of vertical mounting structures 104 along with a plurality of horizontal mounting structures 106. In this illustrated arrangement, the tensioning section frame 102 comprises two horizontal mounting structures 106A,B and seven vertical mounting structures 104A-G. In this preferred arrangement, the vertical mounting structures 104A-G are equally spaced from one another and extend vertically between the two horizontal mounting structures 106A,B.

A plurality of adjustable drag members 150 are mounted on the plurality of vertical mounting structures 104A-G. As just one example, three adjustable drag members 150 A,B,C are mounted on a first vertical mounting structure 104A and seven adjustable drag members 150 D-J are mounted on a second vertical mounting structure 104B. The remainder of the plurality of adjustable drag members 150 are similarly situation among the remaining vertical mounting structures 104C-G. In this tensioning section 100 arrangement illustrated in FIG. 5, a total of forty one (41) adjustable drag members 150 are provided along the plurality of vertical mounting structures 104A-G. As those of ordinary skill will recognize, the tensioning section frame 102 may be provided with more or less than forty-one adjustable drag members 150.

As illustrated, the plurality of spools 130 are removably attached to the plurality of adjustable drag members 150. As just one example, a first spool 130A is attached to a first adjustable drag member 150A and a second spool 130B is attached to a second adjustable drag member 150B. Preferably, each adjustable drag member 150 is individually adjustable (i.e., manually or automatic) so as to adjust an amount of drag that each drag member 150 can provide to the susceptor coil assembly 20 during the fabrication of a ribbon 30. In one exemplary arrangement, the adjustable drag member 150 comprises a slip-clutch mechanism 160. Such a slip-clutch mechanism 160 allows the length of the at least one of the plurality of susceptor coil assemblies 20 wound on the spool 130 to slip as the susceptor coil assembly 20 is pulled from the tensioning section 100 towards the impaling section 300. Such a slip-clutch mechanism 160 is advantageous as it helps to prevent excessive tension (and perhaps breakage) of the susceptor coil assembly 20 during the fabrication of ribbon 30. As those of ordinary skill in the art recognize, such a slip-clutch mechanism 160 is typically utilized in fishing reels.

Figure 7:
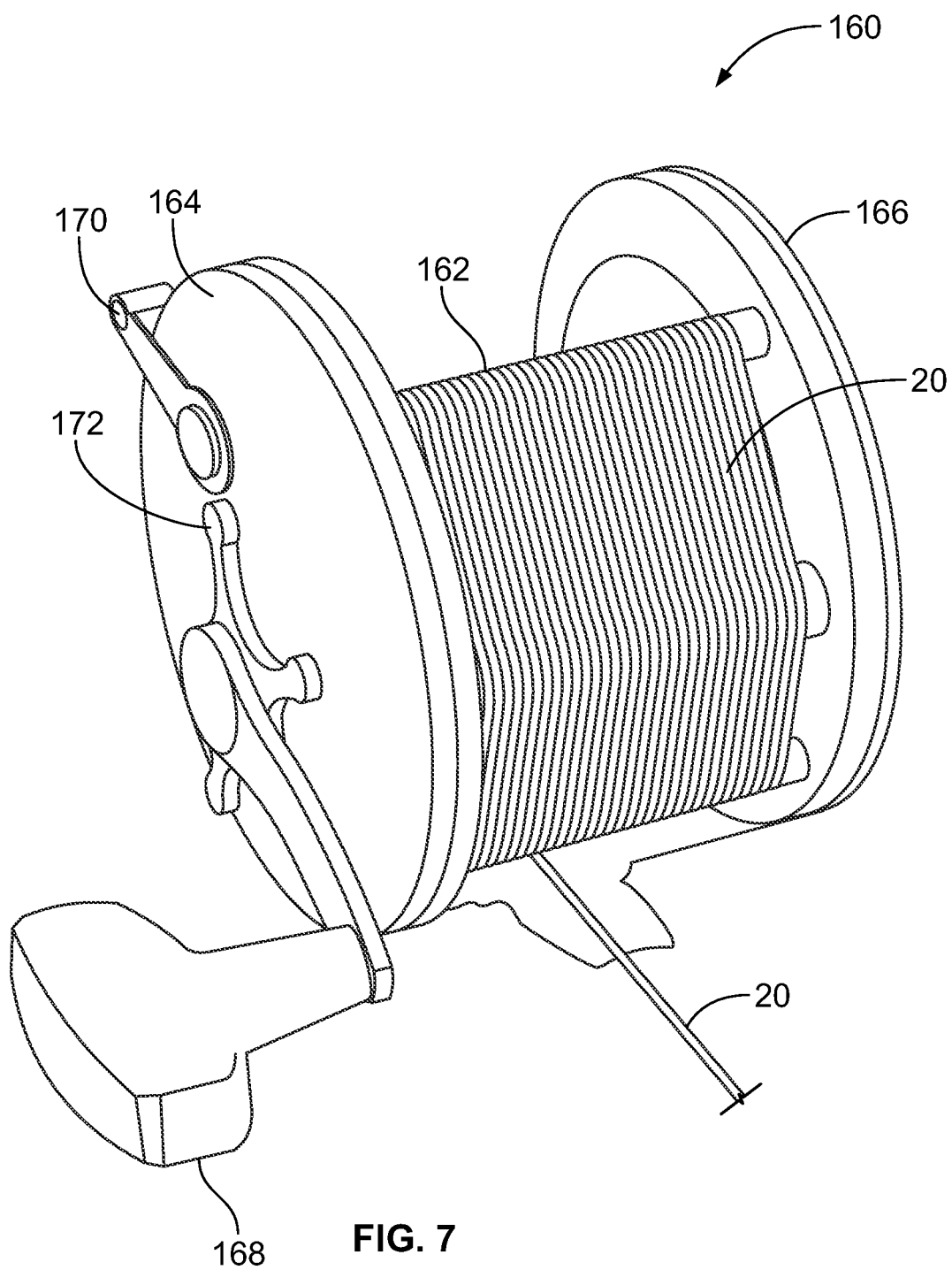
FIG. 7 is a diagrammatic representation of a slip clutch mechanism that may be used with the tensioning section illustrated in FIGS. 5 and 6$_{[TW1]\ [k2]}$.

For example, FIG. 7 is a diagrammatic representation of a slip clutch mechanism 160 that may be used as an adjustable drag member 150 with the tensioning section 100 illustrated in FIGS. 5 and 6. As illustrated, the slip clutch mechanism 160 comprises a spool 162 containing susceptor coil assembly 20 that is positioned between a first side plate 164 and a second side plate 166. The mechanism further comprises a handle 168, a free spool release (i.e., an eccentric lever) 170, and a star drag adjusting member 172. The star drag adjusting member 172 comprises a mechanical device that allows the slip clutch mechanism 160 to apply variable tension to the susceptor coil assembly provided on the spool 162 in order to act as a variable friction brake. This allows a variable resistance to be applied to the susceptor coil assembly after the take up section 400 has begun to pull the plurality of susceptor coil assemblies from the tensioning section 100 and into the collimating section 200 without the susceptor coil assemblies 20 being stretched or breaking.

As those of ordinary skill in the art will recognize, the mechanics of a slip clutch mechanism 160 typically consist of any number of discs (e.g., drag washers) arranged in a stack on the spool shaft or in some cases, on the drive shaft. There is generally a screw or lever mechanism that presses against the washers: the higher the pressure, the greater the resistance. The slip clutch mechanism 160 further comprises a separate free spool release 170 that allows the slip clutch mechanism 160 to go into free spool by disengaging the spool 162 from the drive train completely. This allows the spool 162 to spin freely with little resistance. The free spool position may be used for setting up the apparatus 10, allowing an operator of the apparatus to freely position the susceptor coil assemblies 20 throughout the various sections 100, 200, 300, 400, and 500 of apparatus 10.

Because each adjustable drag member 150 is provided with a separate susceptor coil assembly 20 (like the slip clutch mechanism 160 illustrated in FIG. 7), these plurality of drag members 150 allow the tensioning section 100 to maintain a desired tension in each of the plurality of susceptor coil assemblies 20 as the plurality of susceptor coil assemblies 20 are pulled from the tensioning section 100, into the collimating section 200, and then into the impaling section 300. The take up section 400 may draw or pull the susceptor coil assembly ribbon 30 from the impaling section 300. Alternatively, where a slitting section 500 is utilized in the apparatus 10 illustrated in FIG. 4, the take up section 400 may draw the susceptor coil assembly ribbon 30 from the slitting section 500.

Returning to FIGS. 4-6, the tensioning section frame 102 is releasably attached to the base 800 of the apparatus 10. In this preferred arrangement, the tensioning section frame 102 is releasably attached to the base 800 of the apparatus 10 by way of a plurality of dampening tubes 110 A,B,C. For example, this exemplary apparatus 10 utilizes three dampening tubes 110 A,B,C. These dampening tubes 110 A,B,C provide a number of advantages. For example, these dampening tubes 110 A,B,C help to reduce oscillations that may occur as the susceptor coil assemblies 20 are pulled from the tensioning section frame 105 during ribbon 30 fabrication.

Returning to FIG. 4, the apparatus 10 further includes a collimating section 200 that resides downstream of the tensioning section 100. In this preferred arrangement, the collimating section 200 comprises a plurality of guide tubes 205, an arch structure 210, and a multi-grooved aligning member 215. As illustrated, the arch structure 210 is mounted to the top surface 820 of the base 800 and is configured to retain the plurality of guide tubes 205.

Figure 8:
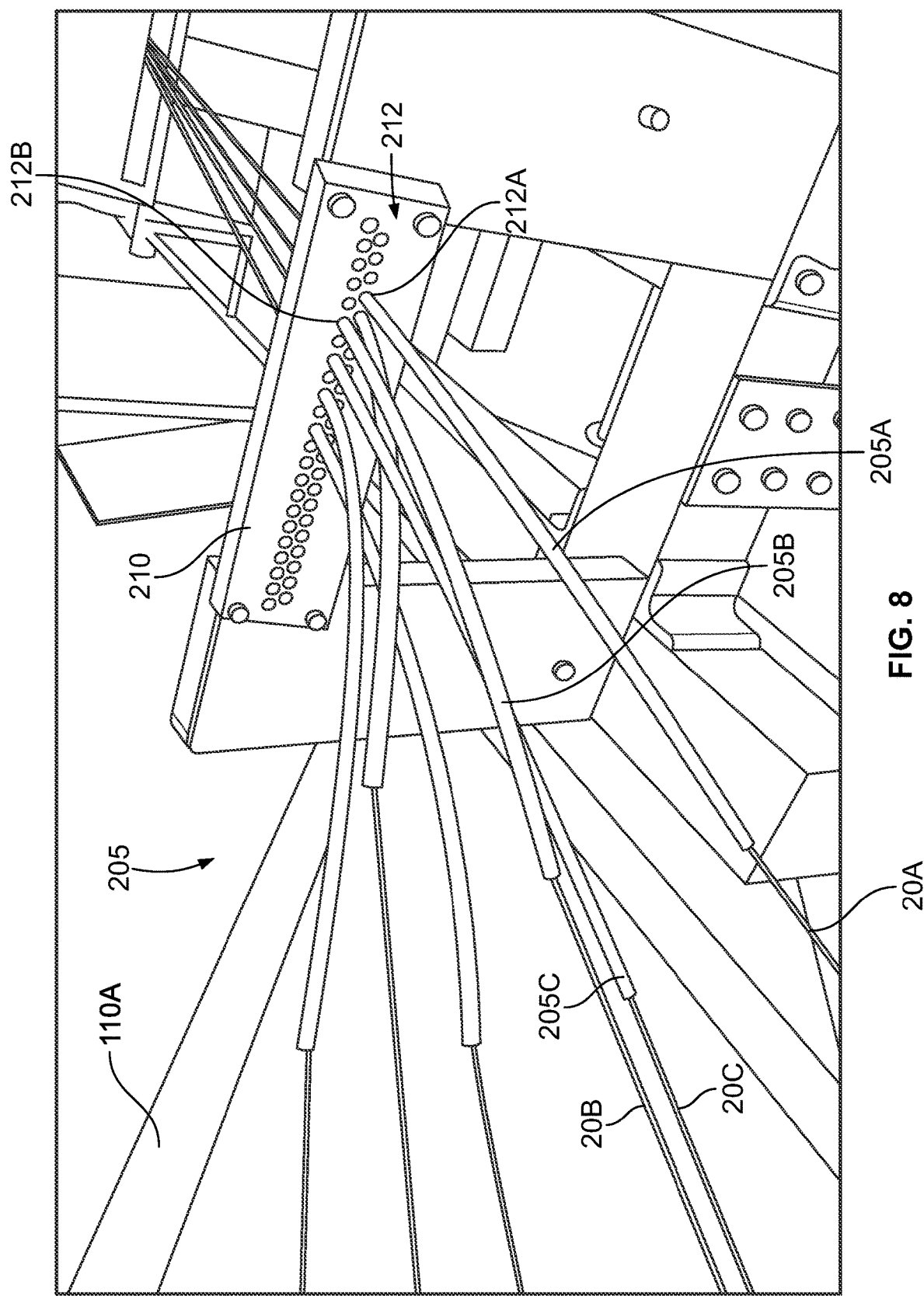
FIG. 8 is a diagrammatic representation of a portion of the collimating section of an apparatus for fabricating a susceptor coil assembly ribbon according to disclosed embodiments.

For example, FIG. 8 is a diagrammatic representation of a portion of the collimating section 200 illustrated in FIG. 4. Specifically, FIG. 8 is a diagrammatic representation of the plurality of guide tubes 205 illustrated in FIG. 4. As shown in FIG. 8, each of the plurality of guide tubes 205 are inserted into one of a plurality of recesses 212 defined by the arch structure 210. For example, a first guide tube 205A is inserted into a first recess 212A defined by the arch structure 210 and a second guide tube 205B is inserted into a second recess 212B defined by the arch structure 210. In this illustrated arrangement, the arch structure 210 comprises fifty-five (55) recesses 212 for receiving the plurality of guide tubes 205. As such, the apparatus 10 illustrated in FIGS. 4 and 8 may be utilized for guiding up to fifty-five (55) susceptor coil assemblies 20 during the fabrication of a susceptor coil assembly ribbon 30. However, as those of ordinary skill will recognize, alternative ribbon arrangements having more or less than fifty-five susceptor coil assemblies 20 may also be fabricated.

As noted in FIG. 8, the plurality of guide tubes 205 receive a susceptor coil assembly 20 from the tensioning section 100. With this illustrated arrangement, as tensioning section 100 comprises forty-one spools 130 with each spool 130 comprising a length of a susceptor coil assembly 20, there are preferably forty-one guiding tubes 105 utilized by the collimating section 200, one guide tube 205 for each susceptor coil assembly 20 contained within the tensioning section 100.

As illustrated, each of the plurality of guide tubes 205 is fixedly attached to the arch structure 210. Preferably, each of the plurality of guide tubes 205 receives one of the susceptor coil assemblies 20 from the tensioning section 100. The guide tubes 205 help to individually isolate and guide the plurality of susceptor coil assemblies 20 from the tensioning section 100 into the multi-grooved aligning member 215 of the collimating section 200. The plurality of guide tubes 205 also help to align the plurality of susceptor coil assemblies 20 prior to impaling the susceptor coil assemblies 20 into the matrix material 320.

In one arrangement, the plurality of guide tubes 205 comprise elongated cylindrical structures. Such elongated cylindrical structures may comprise a synthetic resin made of polymerized tetrafluoroethylene (e.g., Teflon). Polymerized tetrafluoroethylene may be beneficial in certain applications because of this synthetic resin's non-stick or low friction properties. In one preferred arrangement, the plurality of guide tubes 205 comprise ¼ inch tubing. However, the size of the guide tubes 205 may vary based on the size of the susceptor coil assemblies 20 that are being guided from the tensioning section 100 and into the collimating section 200.

Figure 9:
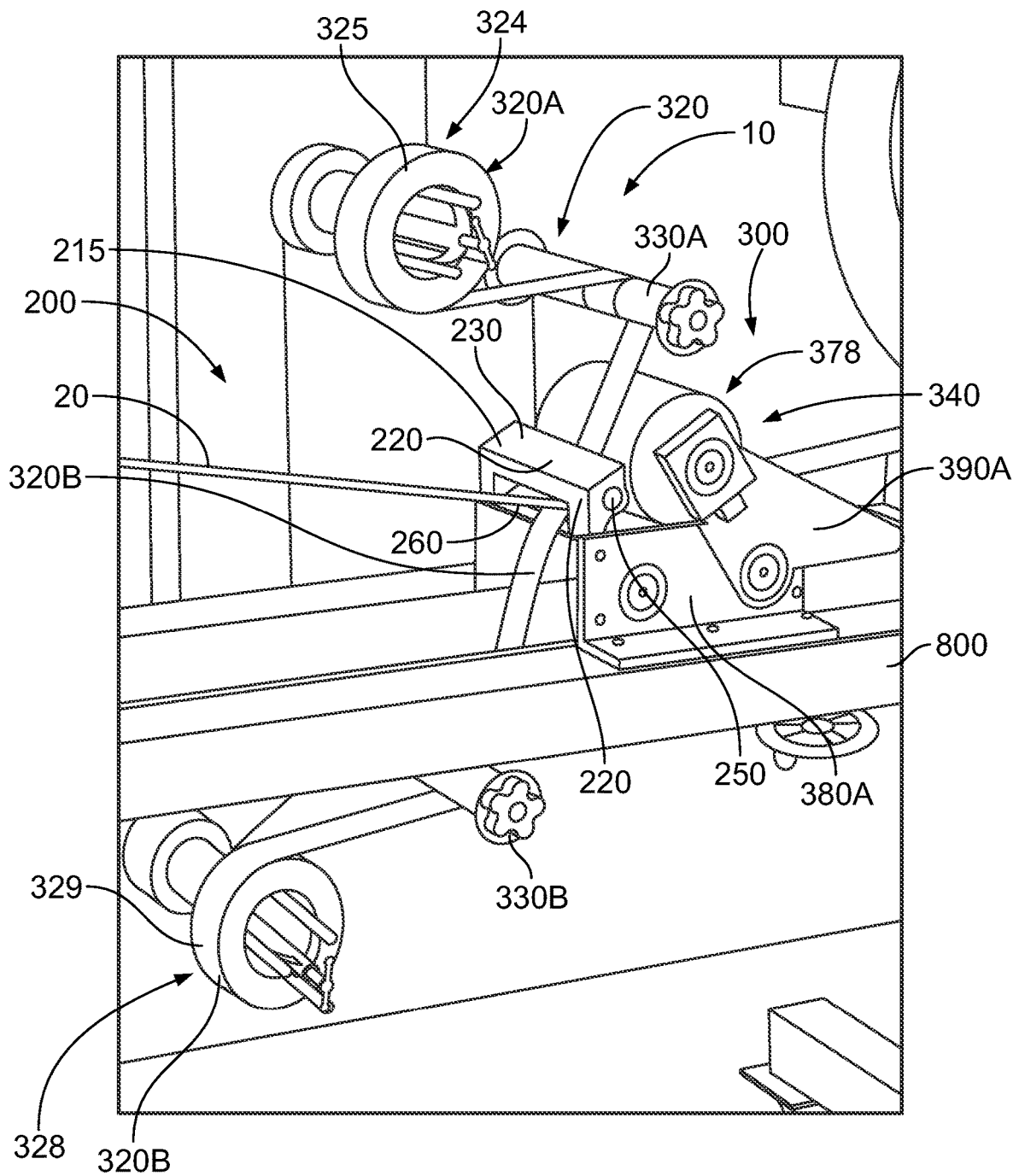
FIG. 9 is a diagrammatic representation of a collimating section of an apparatus for fabricating a susceptor coil assembly ribbon according to disclosed embodiments.

The plurality of guide tubes 205 guide or direct the plurality of susceptor coil assemblies 20 into the impaling section 300. Preferably, the plurality of guide tubes 205 guide the plurality of susceptor coil assemblies 20 into a multi-grooved aligning member 215 of collimating section 200. For example, FIG. 9 is a diagrammatic representation of a collimating section 200 of an apparatus for fabricating a susceptor coil assembly ribbon according to disclosed embodiments. As illustrated, a plurality of susceptor coil assemblies 20 are illustrated as entering the multi-grooved aligning member 215 of collimating section 200. Also illustrated in FIG. 9, a first matrix material source 324 provides matrix material 320A into the collimating section 200 of apparatus 10. Similarly, a second matrix material source 328 provides matrix material 320B into the collimating section 200 of apparatus 10.

Figure 10:
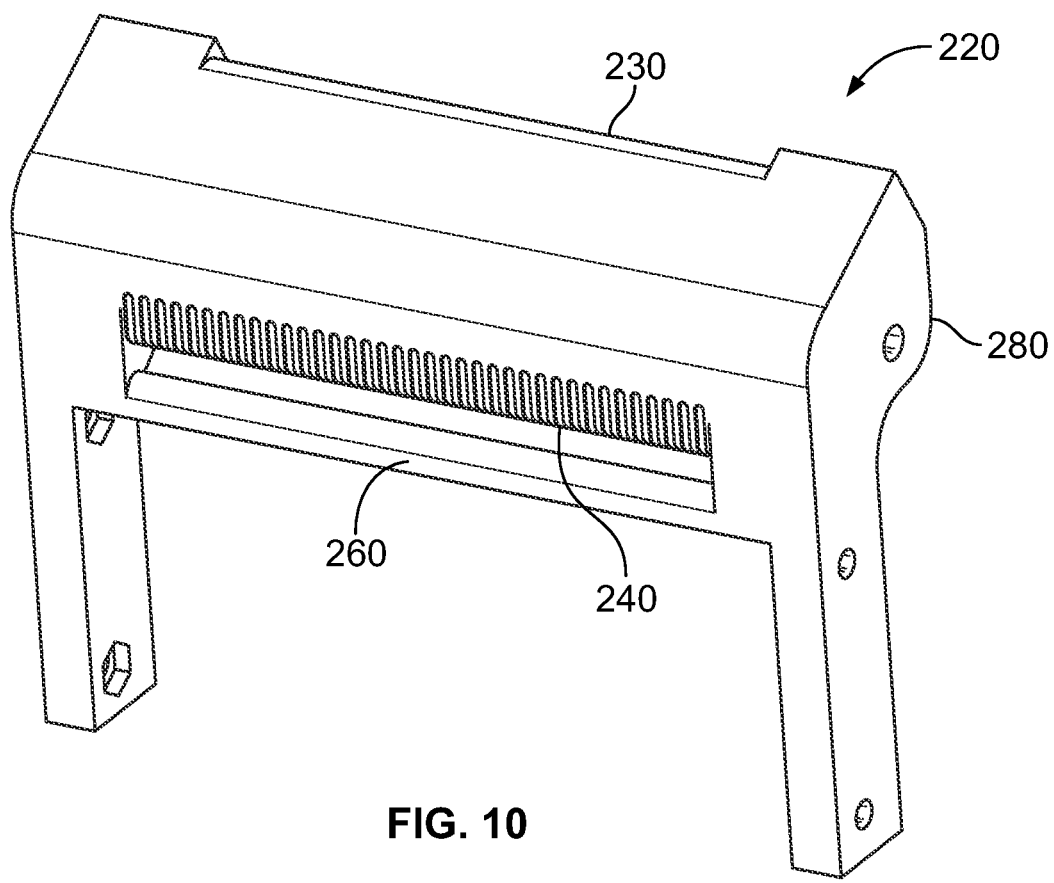
FIG. 10 is a diagrammatic representation of a multi-grooved aligning member of the collimating section illustrated in FIG. 9.
Figure 11:
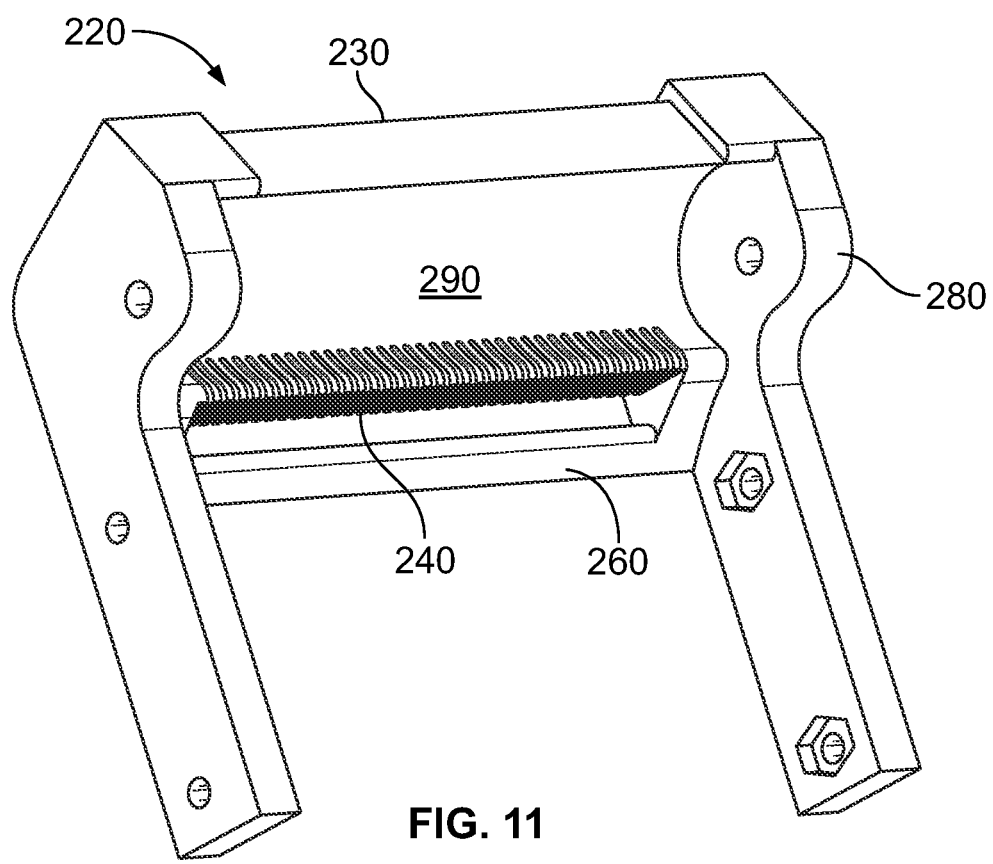
FIG. 11 is a diagrammatic representation of the multi-grooved aligning member housing illustrated in FIG. 10.

The multi-grooved aligning member 215 illustrated in FIG. 9 comprises a multi-grooved aligning member housing 220 that houses a rotating multi-grooved aligning member 250. For example, FIG. 10 is a diagrammatic representation of a multi-grooved aligning member housing 220 that may be used with the multi-grooved aligning member 215 illustrated in FIG. 9. FIG. 11 is another diagrammatic representation of the multi-grooved aligning member housing 220 illustrated in FIG. 10. Referring now to FIGS. 9, 10 and 11, the multi-grooved aligning member housing 220 comprises a slot member 230, a plurality of grooves 240, a support bar 260, a bearing surface 280, and an internal cavity 290 (See, FIG. 11). The internal cavity 290 is configured to receive and house the rotatable multi-grooved aligning member 250 (See, FIG. 12).

During fabrication of the susceptor coil assembly ribbon 30, the plurality of susceptor coil assemblies 20 are guided or directed by the plurality of guide tubes 205 of the tensioning section 100 into a plurality of grooves 240 defined by the multi-grooved aligning member housing 220. Preferably, each groove of the plurality of grooves 240 receives an individual susceptor coil assembly 20. More preferably, each individual groove of the plurality of grooves 240 receives an individual susceptor coil assembly 20 by way of one of the plurality of guide tubes 205. As such, the individual grooves 240 help to ensure alignment the plurality of susceptor coil assemblies 20 as the plurality of assemblies 20 channel through the plurality of grooves 240.

Aside from comprising a plurality of grooves 240, the multi-grooved aligning member housing 220 further comprises a slot member 230. In this illustrated arrangement, a matrix material 320A from a first matrix material source 324 is provided into this slot member 230 before the matrix material 320A is provided to the impaling section 300 (See, e.g., FIG. 9).

The multi-grooved aligning member housing 220 further comprises a support bar 260. As illustrated in FIGS. 9, 10 and 11, the support bar 260 is positioned below the plurality of grooves 240 and is configured to support matrix material 320B provided by the second matrix material source 328 (See, FIG. 9). For example, and now referring to FIG. 13, the plurality of grooves 240 align the plurality of susceptor coil assemblies 20, the slot member 230 receives matrix material 320A from the first matrix material source 324, while the support bar 260 supports the matrix material 320B provided by the second matrix material source 328.

Once the plurality of susceptor coil assemblies 20 are aligned by the grooves 240 of the multi-grooved aligning member housing 220, the plurality of susceptor coil assemblies 20 are further aligned by way of the rotatable multi-grooved aligning member 250. In one preferred arrangement, the rotatable multi-grooved aligning member 250 is positioned within the internal cavity 290 defined by the multi-grooved aligning housing 215 (See, FIG. 11).

Figure 12:
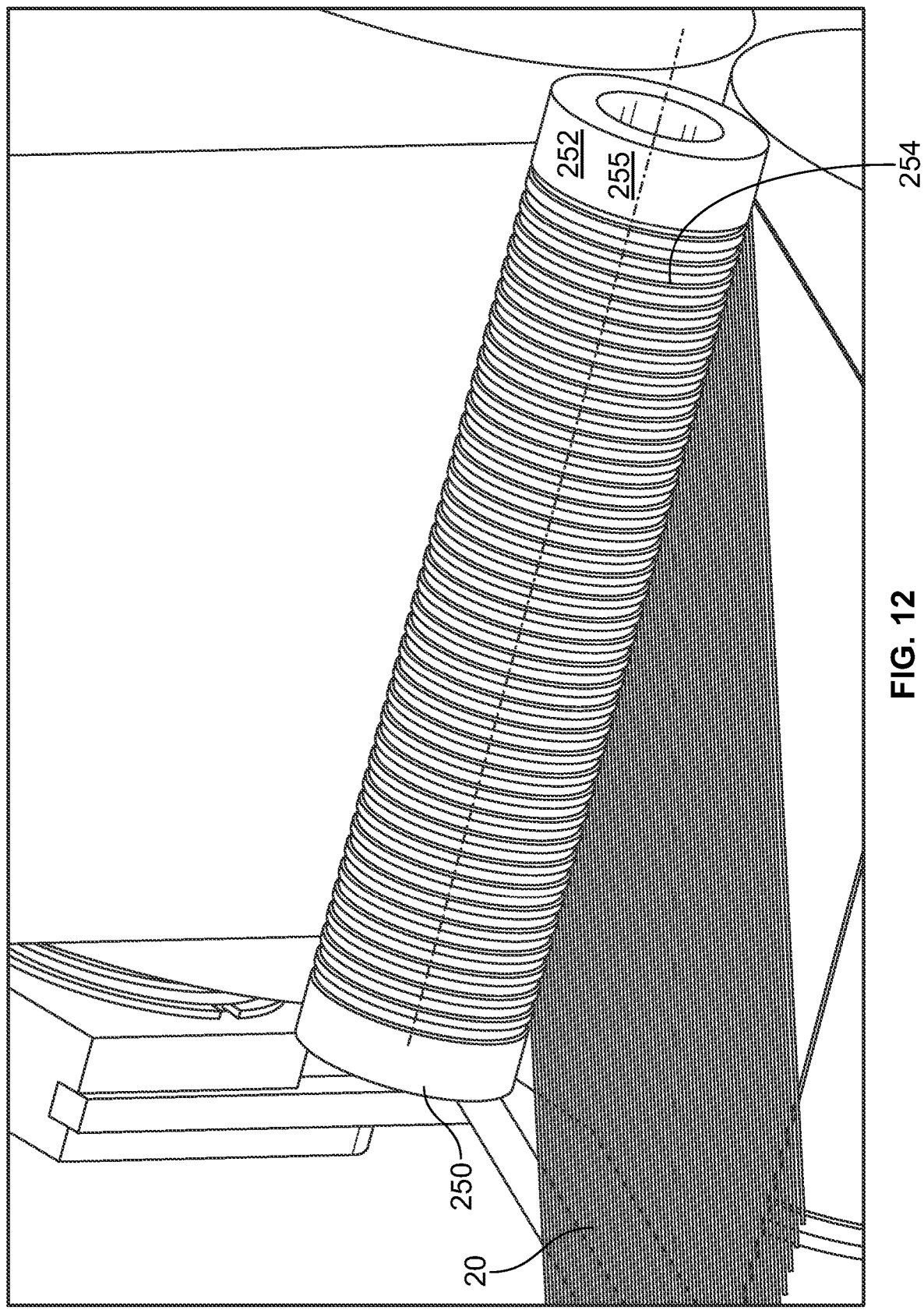
FIG. 12 is a diagrammatic representation of rotating multi-grooved aligning member that is configured to operate with the multi-grooved aligning member illustrated in FIG. 10.

For example, FIG. 12 is a diagrammatic illustration of the rotatable multi-grooved aligning member 250 aligning the plurality of susceptor coil assemblies 20 after the assemblies 20 have been initially aligned by the grooves 240 of the multi-grooved aligning member housing member 220. For ease of illustration, in FIG. 12, the multi-grooved aligning member housing 220 is not illustrated. As illustrated, the rotatable multi-grooved aligning member 250 comprises a rotatable cylindrical structure 255. The cylindrical structure 255 of the rotatable multi-grooved aligning member 250 further comprises an outer surface 252 that defines a plurality of grooves 254. Specifically, in this illustrated arrangement, the rotatable multi-groove aligning member 250 comprises thirty-six (36) grooves for receiving and aligning the plurality of susceptor coil assemblies 20.

Returning to FIG. 9 and as noted herein, aside from receiving the now aligned the plurality of assemblies 20 from the collimating section 200, the impaling section 300 also receives at least one layer of a matrix material 320. In the apparatus 10 illustrated in FIG. 4 and the impaling section illustrated in FIG. 9, two sources of matrix material 320 are provided: a first matrix material source 324 providing a first matrix material 320A and a second matrix material source 328 providing a second matrix material 320B.

In one arrangement, the first matrix material 320A may be the same as the second matrix material 320B. In an alternative arrangement, the first matrix material 320A may be different than the second matrix material 320B. Referring back to FIGS. 4 and 9, the first matrix material source 324 comprises a plurality of layers of matrix material provided on a roll 325. As this layer of matrix material 320A is removed from the roll 325, the matrix material 320A transitions over a guide roll 330A. After the material 320A transitions over the guide roll 330A, the matrix material 320A is then received by the slot member 230 of the multi-grooved aligning member housing 220.

Similarly, the second matrix material source 328 comprises a plurality of layers of matrix material 320B provided on a roll 329. As these layers of matrix material 320B are removed from the roll 329, the matrix material 320B transitions over a guide roll 330B. After the matrix material 320B transitions over the guide roll 330B, the matrix material 320B is received by the support bar 260 of the multi-grooved aligning member housing 220.

Figure 13:
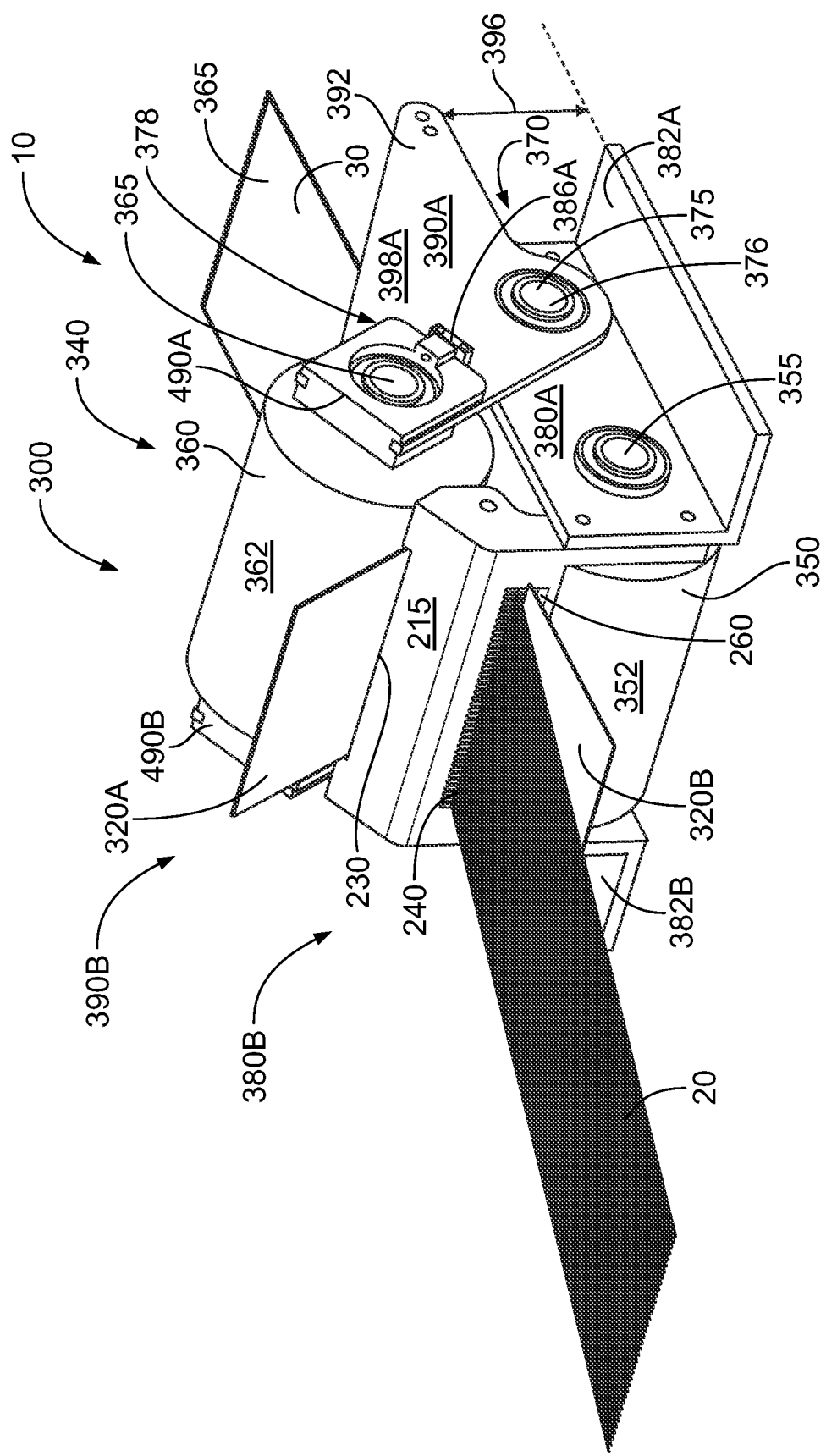
FIG. 13 is a diagrammatic representation of an impaling section of an apparatus for fabricating a susceptor coil assembly ribbon according to disclosed embodiments.
Figure 14A:
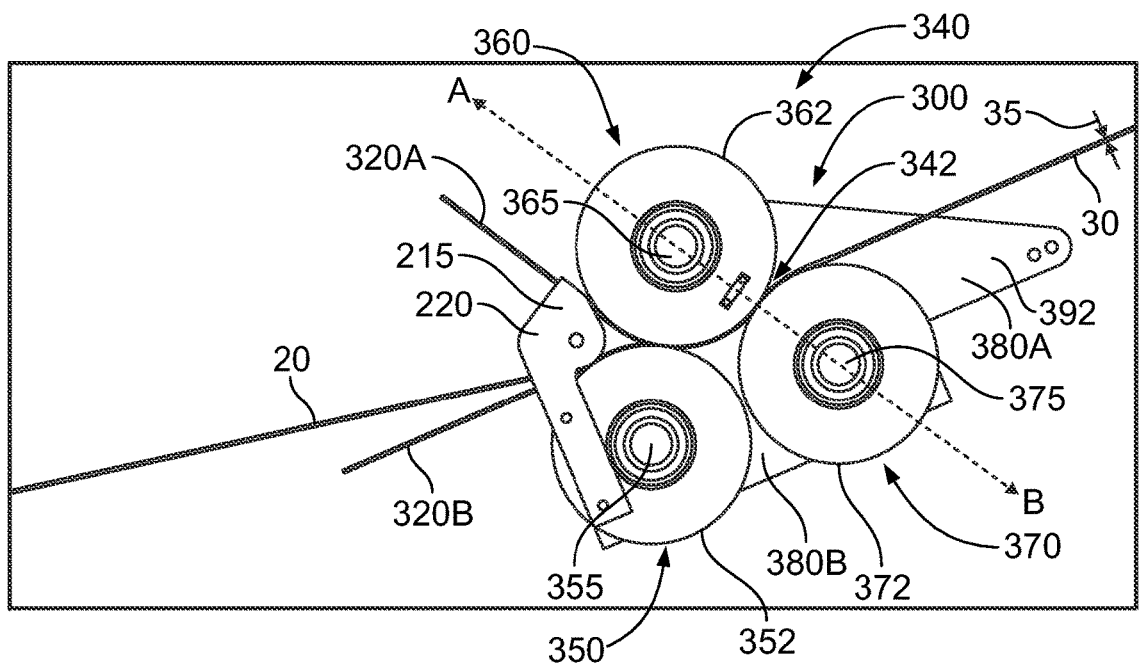
FIG. 14A is another diagrammatic representation of an impaling section of an apparatus for fabricating a susceptor coil assembly ribbon according to disclosed embodiments.

FIG. 13 is a diagrammatic representation of an impaling section 300 of an apparatus for fabricating a susceptor coil assembly ribbon 30 according to disclosed embodiments. FIG. 14A is a diagrammatic representation of the plurality of pinch rollers 340 illustrated FIG. 13 receiving the plurality of susceptor coil assemblies 20, the matrix material 320A from a first matrix material source 324, and matrix material 320B from a second matrix material source 328. For ease of illustration, a first stationary face plate 380A and a first movable face plate 390A of the impaling section 300 has been removed.

Figure 14B:
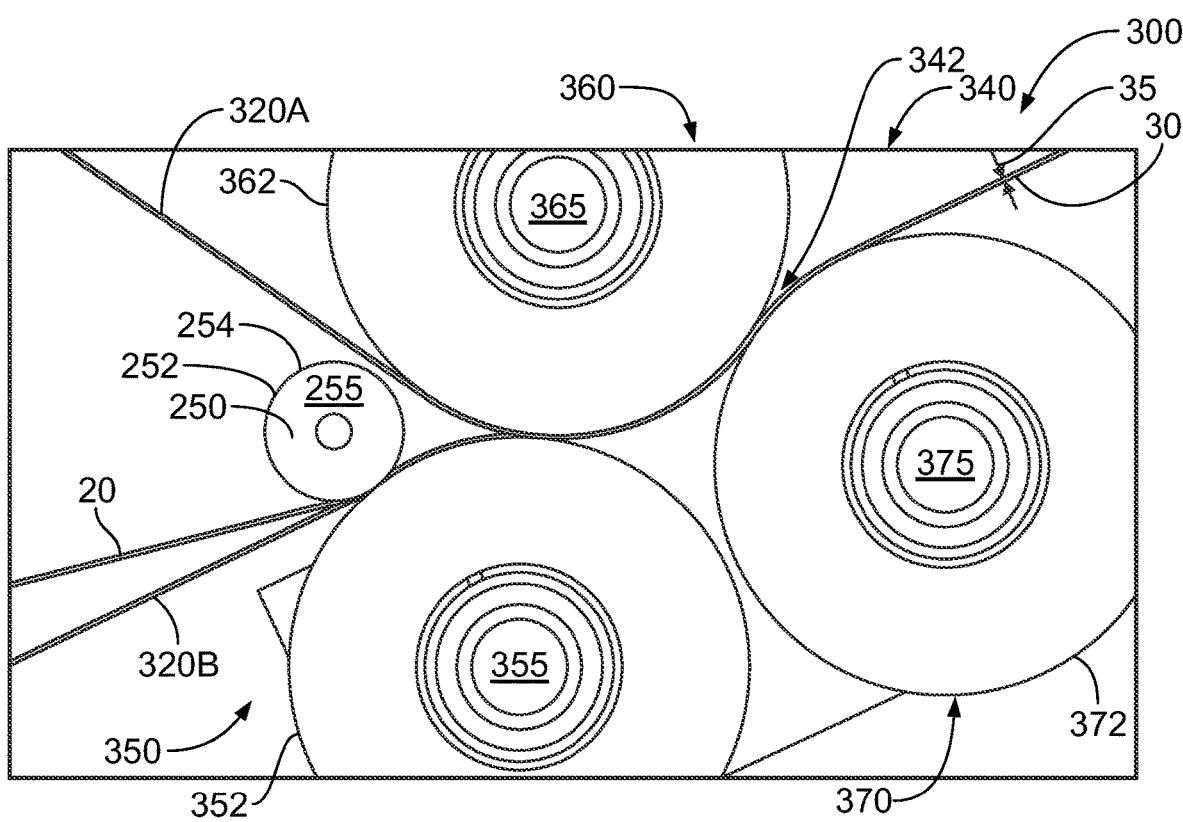
FIG. 14B is another diagrammatic representation of an impaling section of an apparatus for fabricating a susceptor coil assembly ribbon according to disclosed embodiments.

FIG. 14B is another diagrammatic representation of an impaling section 300 of an apparatus for fabricating a susceptor coil assembly ribbon 30 according to disclosed embodiments. As illustrated in FIGS. 13, 14A and B, after the plurality of susceptor coil assemblies 20 enter the collimating section 300, the coil assemblies 20 are provided to the plurality of pinch rollers 340. Preferably, the plurality of pinch rollers 340 are configured to simultaneously receive the matrix material 320A, the matrix material 320B, and the plurality of susceptor coil assemblies 20. Specifically, in this illustrated arrangement, the plurality of pinch rollers 340 comprise three pinch rollers: a first pinch roller 350, a second pinch roller 360, and a third pinch roller 370.

In this arrangement, the first pinch roller 350 is operably coupled to the multi-grooved aligning member 215. The first pinch roller 350 initially receives the matrix material 320B that passes over the support bar 260 of the guide member housing 220 (See, e.g., FIG. 13). In addition, the first pinch roller 350 also receives the plurality of susceptor coil assemblies 20 that are aligned by the plurality of grooves 254 defined along the outer surface 252 of the rotatable multi-grooved aligning member 250. The outer surface 252 of the rotatable multi-grooved aligning member 250 acts together with an outer surface 352 of the first pinch roller 350 so as to initially compress press or pinch the susceptor coil assemblies 20 and the matrix material 320B together (See, e.g., FIG. 14B).

After the matrix material 320A passes into the slot member 230 of the aligning member housing 220 (See, e.g., FIG. 13), the matrix material 320A passes along an outer surface 362 of the second pinch roller 360 (See, e.g., FIGS. 14A and 14B). The outer surface 362 of the second pinch roller 360 and the outer surface 352 of the first pinch roller 350 act together to initially compress or pinch the plurality of susceptor assemblies 20 between matrix material 320A and matrix material 320B.

After this initial compression, the outer surface 362 of the second pinch roller 360 and the outer surface 372 of the third pinch roller 370 act together to further compress or sandwich the plurality of susceptor assemblies 20 between the matrix material 320A and the matrix material 320B to fabricate a susceptor coil assembly ribbon 30 comprising a desired depth 35. Preferably, this susceptor coil assembly ribbon depth 35 is a function of a pinch roller distance or gap 342 that is adjustable between the outer surface 362 of the second pinch roller 360 and the outer surface 372 of the third pinch roller 370.

In a preferred arrangement, the apparatus 10 comprises an adjusting mechanism 378 that allows for the pinch roller gap 342 between outer surface 362 of the second pinch roller 360 and the outer surface 372 of the third pinch roller 370 to be adjusted. For example, returning to FIG. 13, the impaling section 300 comprises a first stationary plate 380A and a second stationary plate 382B. (only the first stationary face plate 380A is fully illustrated in FIG. 13). As further illustrated, the first pinch roller 350 and third pinch roller 370 are positioned between a first stationary face plate 380A and a second stationary face plate 380B. The first and second stationary face plates 380A,B are configured to contain a rotating shaft 355 of the first pinch roller 350 and a rotating shaft 375 of the third pinch roller 370. The stationary face plates 380A,B further comprise horizontal mounting plates 382A,B, respectively that allows the plurality of pinch rollers 340 to be mounted to the top face 820 of the apparatus base. (See, FIG. 4) In a preferred arrangement, the first and second stationary face plates 380A,B, prevent certain undesired movement of the first pinch roller 350 with respect to the third pinch roller 370.

The impaling section 300 further comprises a first movable face plate 390A and a second movable face plate 390B. (FIG. 13 illustrates only the first moveable face plate 390A). As illustrated, the first movable face plate 390A is configured to contain a rotating shaft 365 of the second pinch roller 360 and the rotating shaft 375 of the third pinch roller 370. Importantly, the rotating shaft 375 of the third pinch roller 370 acts as a pivot point 376 for the first movable face plate 390A by way of a spring force 396 acting on an arm portion 392 of the first movable face plate 390A. As such, based on this spring force 396 acting on the arm portion 392 of the first movable face plate 390A, a predetermine amount of compression can be exerted between the outer surface 352 of the first pinch roller 350 and the outer surface 362 of the second pinch roller 360 (See, FIGS. 14A and B). The second movable face plate 390B acts in a similar fashion as the first movable face plate 390A herein described.

Mounted along an external surface 398A of the first movable face plate 390A is a first adjusting plate 490A. A similar adjusting plate 490B is mounted on an external surface 398B of the second movable face plate 390B. Both the first and the second adjusting plates 490A,B can be adjusted so as to move the first and second adjusting plates 490A,B (and therefor the rotating shaft 365 of the second pinch roller 360) along the A-B direction as illustrated in FIG. 14A. As such, movement of the first and second adjusting plates 490A,B allows the pinch roller distance 342 between the outer surface 362 of the second pinch roller 360 and the outer surface 372 of the third pinch roller 370 to be adjusted to a desired distance. In this illustrated arrangement, this distance 342 between these outer surfaces 362, 372 may be varied by way of a first adjusting screw 386A for the first adjusting plate 490A and a second similar adjusting screw 386B for the second adjusting plate 490B.

Figure 16:
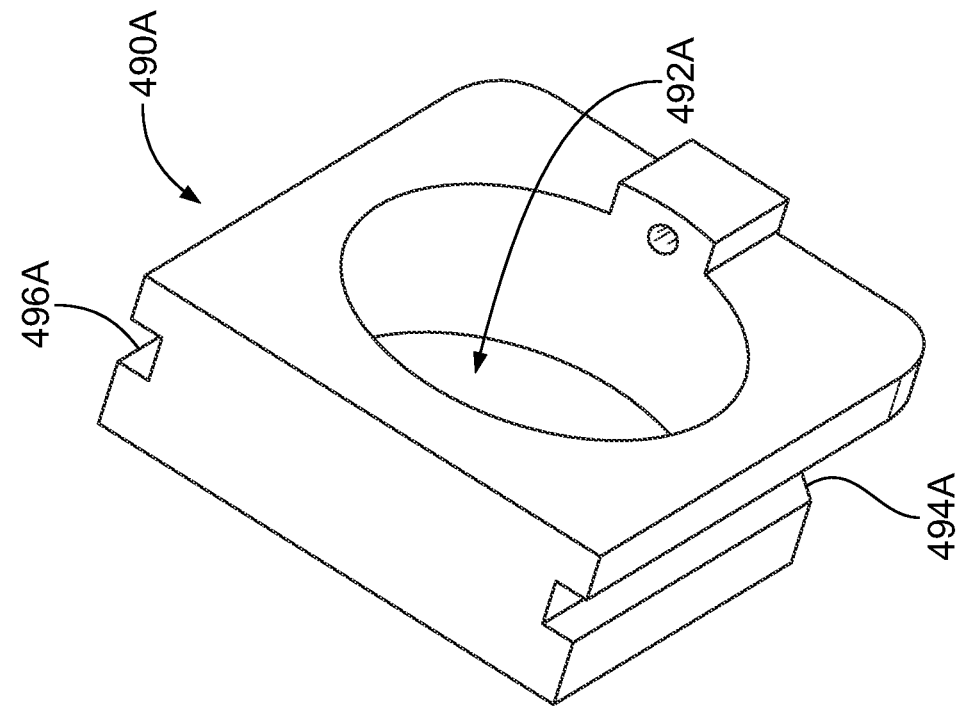
FIG. 16 is another diagrammatic representation of an adjusting plate for use with a plurality of pinch rollers as disclosed herein.
Figure 15:
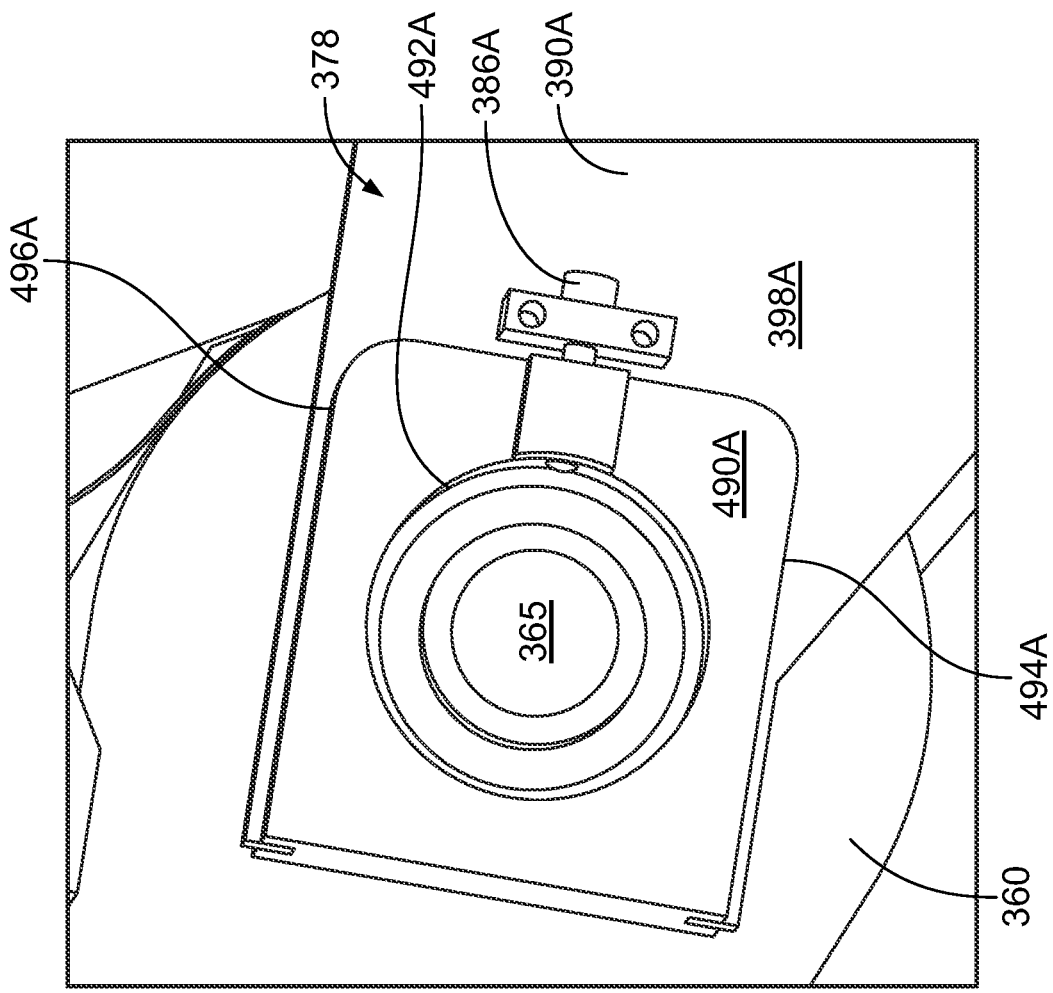
FIG. 15 is a diagrammatic representation of an adjusting plate used to adjust the positions of the pinch rollers illustrated in FIG. 14.
Figure 17:
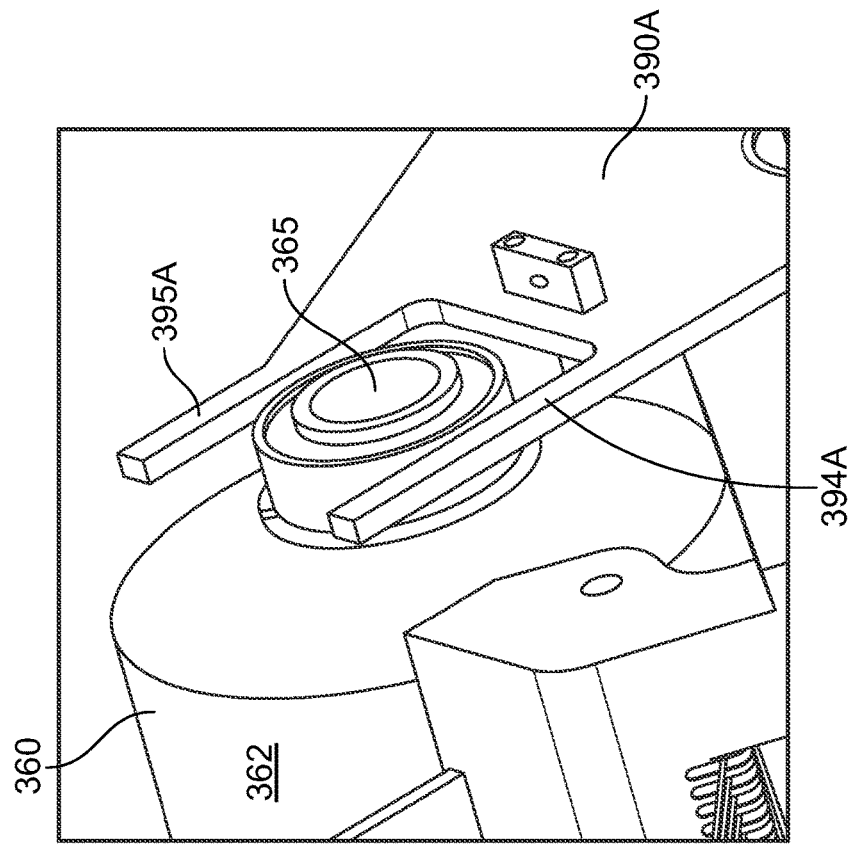
FIG. 17 is another diagrammatic representation of an impaling section as disclosed herein.

FIG. 15 illustrates a diagrammatic representation of the first adjusting plate 490A illustrated in FIG. 13. As illustrated, the first adjusting plate 490A resides along the external surface 398A of the first movable face plate 390A. FIG. 16 is diagrammatic representation of the first adjusting plate 490A illustrated in FIG. 15. Referring now to FIGS. 15 and 16, the first adjusting plate 490A is generally rectangular in shape and defines a circular recess 492A for receiving the rotating shaft 365 of the second pinch roller 360. The adjusting plate 490A further comprises a first slot or groove 494A and a second slot or groove 496A. These slots or grooves 494A,B are defined along first and second outer edges of the adjusting plate 490A. Specifically, the first and second slots 494A, 496A are configured to engage a first tongue 394A and second tongue 395A of the first moveable face plate 390A, respectively. For example, FIG. 17 illustrates the first and second tongues 394A, 395A of the first movable face plate 390A. As such, by turning the first adjusting screw 386A, the first adjusting plate 490A will be moved along the first and second tongues 394AB of the first moveable face plate 390A. The second adjusting plate 490B can be moved in a similar manner. As a result, the distance 342 between the outer surface 362 of the second pinch roller 360 and the outer surface 372 of the third pinch roller 370 may be adjusted. Such an adjustment mechanism 378 allows for a resulting ribbon 30 to comprise a predetermined ribbon depth 35 based on this adjustable distance 342.

Figure 18:
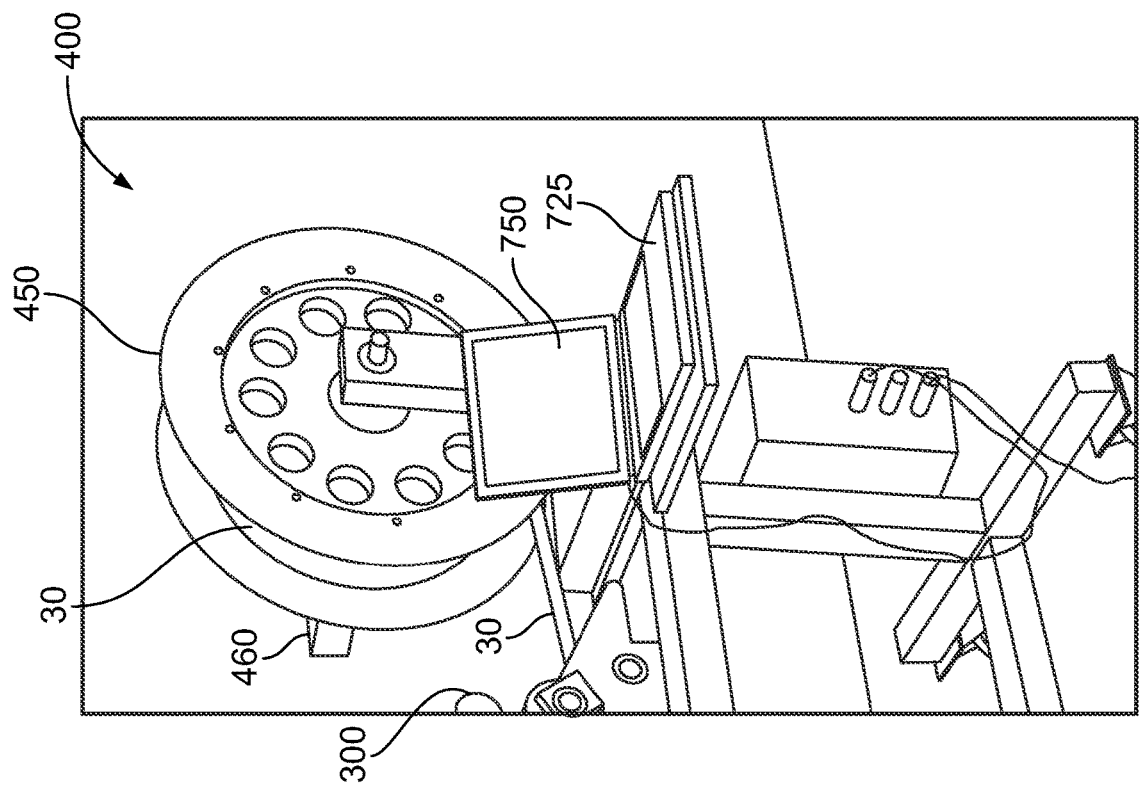
FIG. 18 a diagrammatic representation of a take up section illustrated in FIG. 4.
Figure 19:
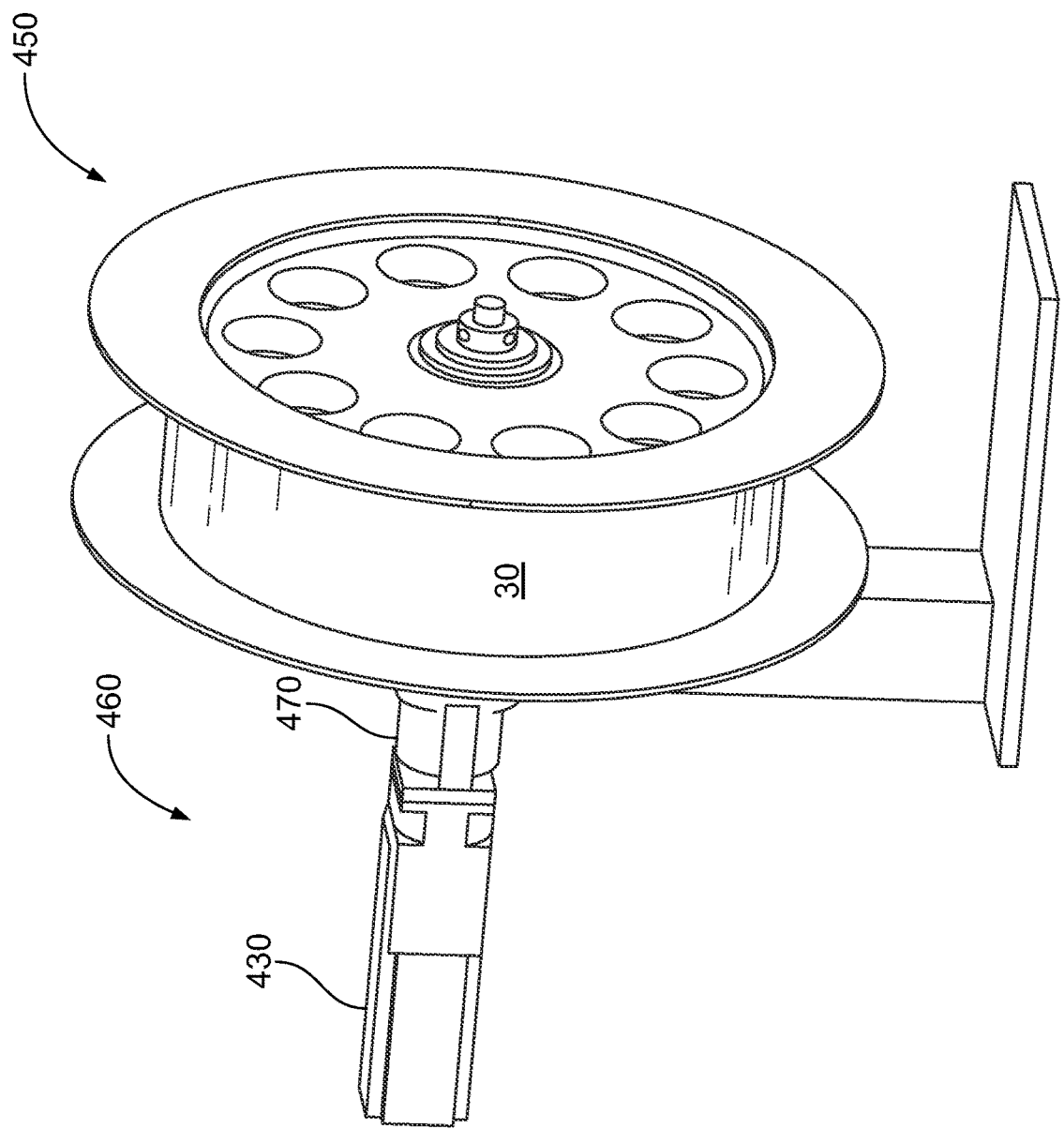
FIG. 19 a diagrammatic representation of a take up spool of the take up section illustrated in FIG. 18.

FIG. 18 a diagrammatic representation of a take up section 400 of the apparatus 10 illustrated herein. FIG. 19 a diagrammatic representation of a take up spool 450 of the take up section 400 illustrated in FIG. 18. Referring now to FIGS. 18 and 19, the take up section 400 is positioned downstream of the impaling section 300 and receives the susceptor coil assembly ribbon 30 from the impaling section 300. The take up section 400 comprises a take up spool 450, a computing device 725, and a programmable drive system 460. The programmable drive system 460 comprises a programmable drive 430 and a take up motor 470. An encoder is provided on an output shaft of the take up motor 470. By way of a programmable drive system 460, the speed of the take up motor 470 is programmed by way of the graphical user interface 750 provided by the computing device 725 to maintain a desired amount of tension in the plurality of susceptor coil assemblies 20 as these assemblies are pulled from the tensioning section 100 towards the impaling section 300.

As illustrated in FIG. 19, a programmable drive system 460 is mounted to the take up spool 450. In one preferred arrangement, the programmable drive system 460 is programmable to operate a programmable drive 430 and a take up motor 470 to achieve a desired feed rate of the plurality of susceptor coil assemblies 20 from the tensioning section 100 to the impaling section 300. Preferably, the take up motor 470 comprises a smart motor such as an induction motor comprising an integral encoder that provides position shaft position feedback to the system software 700. In one preferred arrangement, the programmable drive system 460 may be operated and controlled by way of a computing device 725 running the system software 700.

The tensioning section 100, the collimating section 300, the impaling section 300, and the take up section 400 may all be operated by way of the computing device 725 wherein the system software 700 may be accessible by way of a graphical user interface 750. As previously described, the system software may comprise a G-code logic system software provided by Moog Animatics. The apparatus 10 comprises a programmable drive system (e.g., a smart motor) that may be operated so as to fabricate a susceptor coil assembly ribbon 30 comprising a plurality of susceptor coil assemblies (such as the susceptor coil assembly illustrated in FIG. 2) that are impaled into a matrix material 320 (e.g., one or more layers of matrix material).

Figure 20:
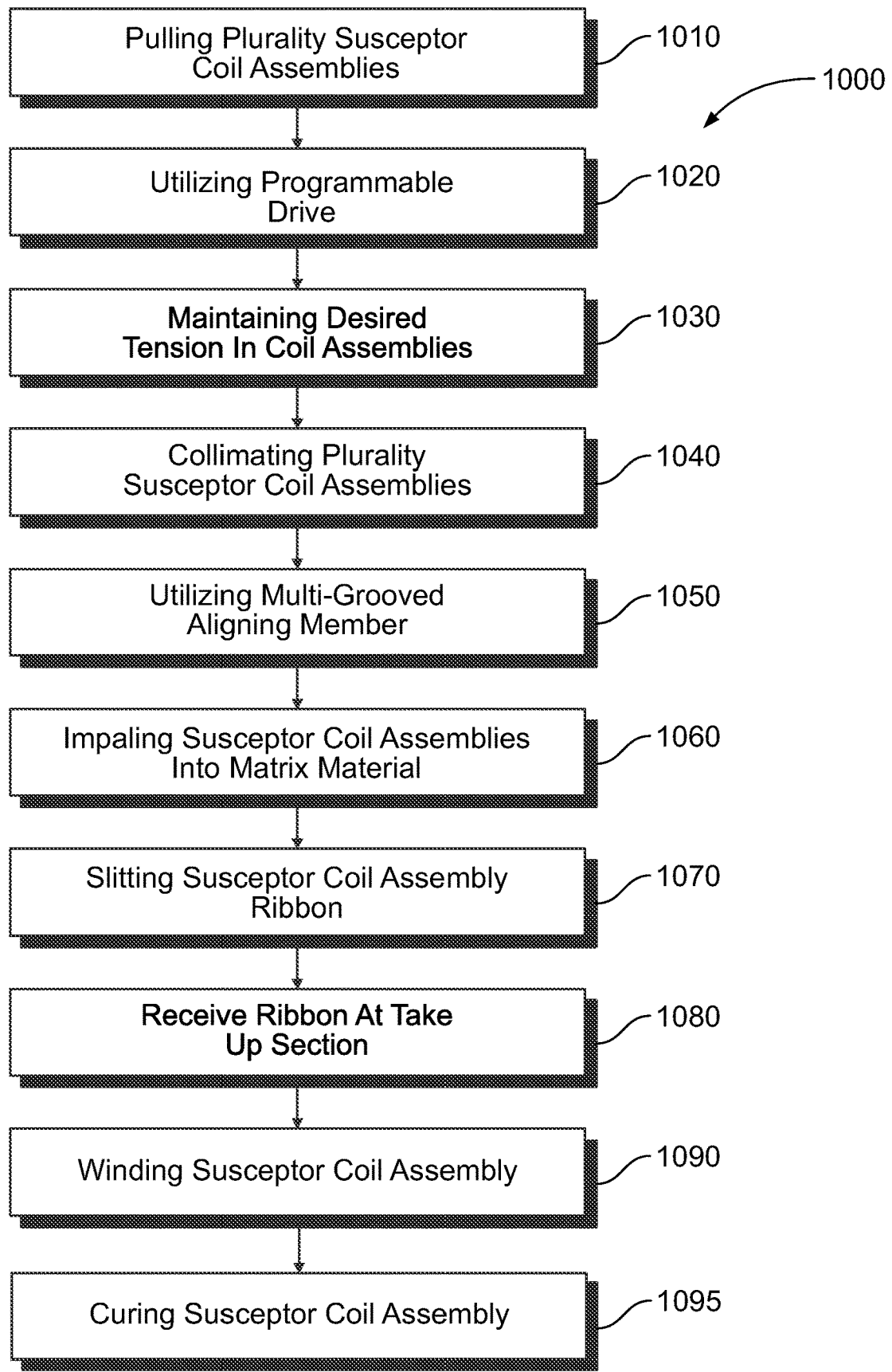
FIG. 20 illustrates steps of a method of fabricating a susceptor coil assembly ribbon, such as the susceptor coil assembly ribbon disclosed herein.

FIG. 20 illustrates a method 1000 of fabricating a susceptor coil assembly ribbon 30 comprising a plurality of susceptor coil assemblies 20, such as the susceptor coil assembly illustrated in FIG. 2. According to one arrangement, the method includes the step 1010 of pulling a plurality of susceptor coil assemblies 20 from a tensioning section 100 towards a collimating section 200. At step 1020, the method includes the step of utilizing a programmable drive 430 to pull the plurality of susceptor coil assemblies 20 from the tension section 100 through the impaling section 300, the programmable drive 430 programmable to operate a take up motor 470.

The method further includes the step 1030 of maintaining a desired tension in the plurality of susceptor coil assemblies 20 as the plurality of susceptor coil assemblies 20 are pulled from the tension section 100 and into the collimating section 200.

The method further includes the step 1040 of collimating the plurality of susceptor coil assemblies 20 as the plurality of susceptor coil assemblies 20 are pulled from the tensioning section 100 towards a collimating section 200. The step of collimating may include the step of aligning the plurality of susceptor coil assemblies 20. Specifically, the method includes the step 1050 of utilizing a multi-grooved aligning member housing 220 comprising a plurality of grooves 240 to align the plurality of susceptor coil assemblies 20 as the plurality of susceptor coil assemblies 20 are pulled from the tensioning section 100 and into the impaling section 300.

The method further includes the step 1060 of impaling the plurality of susceptor coil assemblies 20 into a matrix material 320 so as to fabricate a susceptor coil assembly ribbon 30. For example, impaling the plurality of susceptor coil assemblies 20 into a matrix material 320 so as to fabricate a susceptor coil assembly ribbon 30 may comprise impaling the plurality of susceptor coil assemblies 20 into at least one layer of the matrix material 320. The matrix material 320 may be provided by a first matrix material source 324. Alternatively, the matrix material 320 may be provided by a first matrix material source 324 and a second matrix material source 328.

The method may include the optional step of slitting 1070 the susceptor coil assembly ribbon 30 to a desired width 40.

The method may also include the optional step 1080 of receiving the susceptor coil assembly ribbon 30 from the impaling section 300 by a take up section 400 comprising a take up spool 420. The method includes the step 1090 of winding the susceptor coil assembly ribbon 30 onto the take up spool 420.

The method may also include the step 1090 of curing the susceptor coil assembly ribbon 30.

Figure 21:
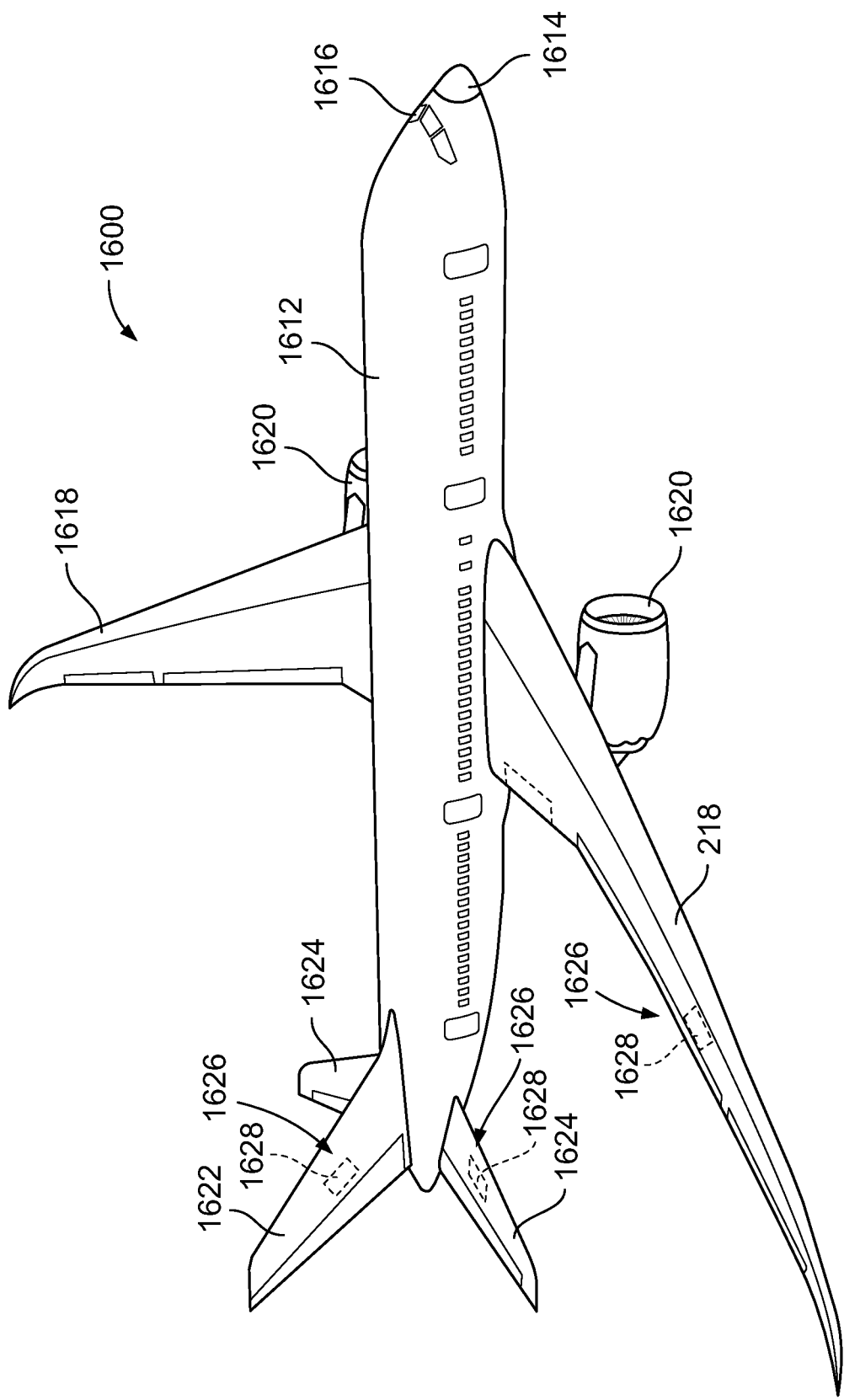
FIG. 21 is a diagrammatic representation of a perspective view of an aircraft that may incorporate one or more composite laminate structures manufactured in accordance with one or more embodiments disclosed herein.

FIG. 21 is an illustration of a perspective view of an aircraft 1600 that may incorporate one or more composite laminate structures heated by a heating blanket incorporating one of the susceptor coil assembly ribbon embodiments of the present disclosure.

As shown in FIG. 21, the aircraft 1600 comprises a fuselage 1612, a nose 1614, a cockpit 1616, wings 1618 operatively coupled to the fuselage 1620, one or more propulsion units 1620, a tail vertical stabilizer 1622, and one or more tail horizontal stabilizers 1624. Although the aircraft 1600 shown in FIG. 21 is generally representative of a commercial passenger aircraft, heating blankets comprising one or more susceptor coil assemblies as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles heated by susceptor coil assembly based heating blankets as disclosed herein.

Figure 22:
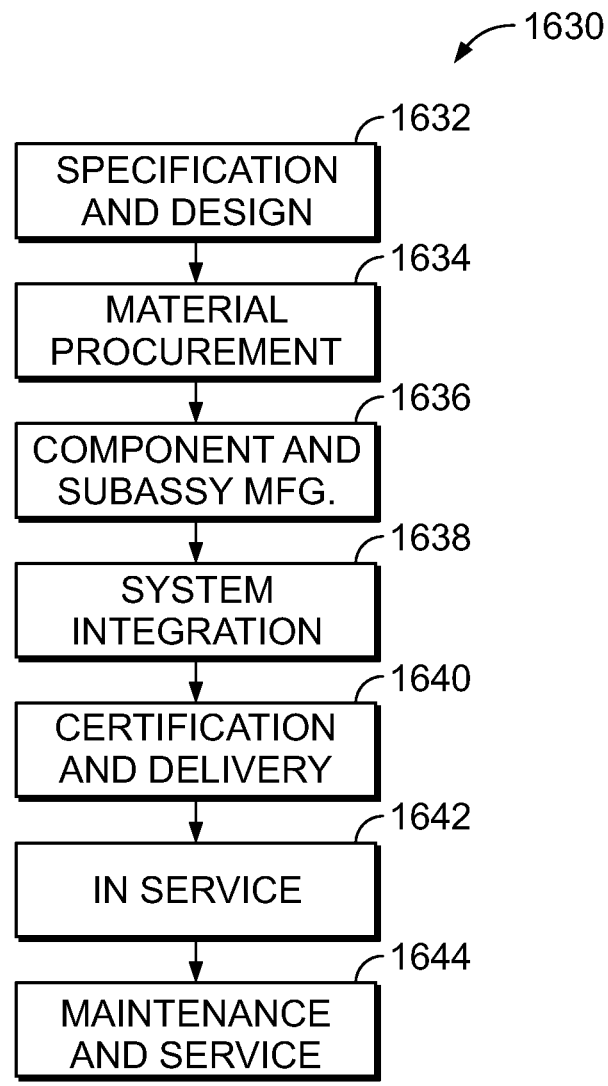
FIG. 22 is a diagrammatic representation of a flow diagram of aircraft production and service methodology.
Figure 23:
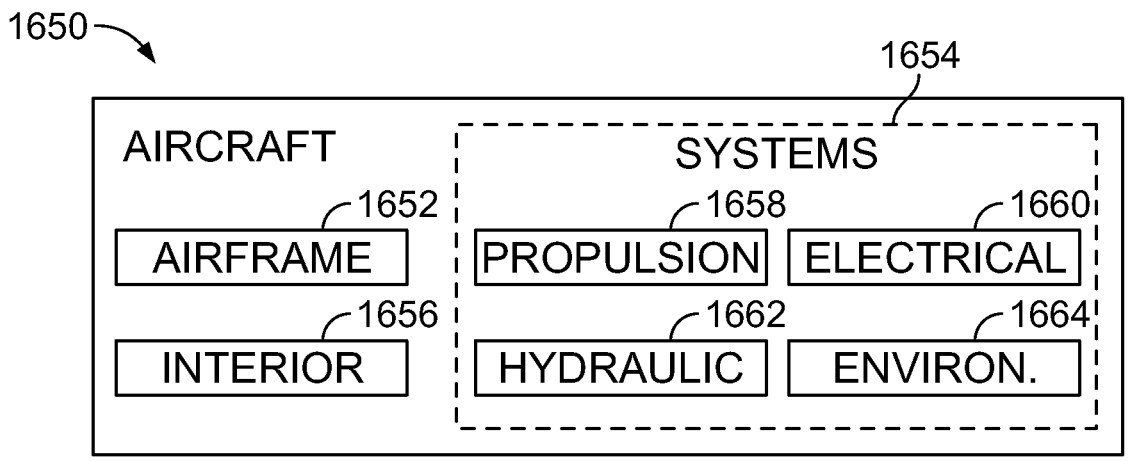
FIG. 23 is a diagrammatic representation of a block diagram of an aircraft.

Embodiments of the disclosure may find use in a variety of potential applications, particularly in the transportation industry, including for example, aerospace, marine, automotive applications and other application where thermoplastic composite tubular structures may be used. Therefore, referring now to FIGS. 22 and 23, embodiments of the disclosure may be used in the context of an aircraft manufacturing and service method 1630 as shown in FIG. 22 and an aircraft 1650 as shown in FIG. 23. Aircraft applications of the disclosed embodiments may include, for example, without limitation, the design and fabrication of composite laminates fabricated by way of a releasable support as disclosed herein.

During pre-production, exemplary method 1630 may include specification and design 1632 of the aircraft 1650 and material procurement 1634. As just one example, at this step, this might include the selection of material type of susceptor conductor or conductors may be determined at this step. In addition, during this step, the various heating requirements of a susceptor coil assembly based heating blanket may be determined. For example, during this step, the number of susceptor coil assemblies to be used in a specific heating blanket application may be determined.

During production, component and subassembly manufacturing 1636 and system integration 1638 of the aircraft 1650 takes place. After such a component and subassembly manufacturing step, the aircraft 1650 may go through certification and delivery 1640 in order to be placed in service 1642. While in service by a customer, the aircraft 1650 is scheduled for routine maintenance and service 1644, which may also include modification, reconfiguration, refurbishment, and so on.

Each of the process steps of method 1650 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 1650 produced by exemplary method 1630 may include an airframe 1652 with a plurality of high-level systems 1654 and an interior 1656. Examples of high-level systems 1654 may include one or more of a propulsion system 1658, an electrical system 1660, a hydraulic system 1662, and an environmental system 1664. Any number of other systems may be included. Although an aerospace example is shown, the principles of the disclosure may be applied to other industries, such as the marine and automotive industries.

Systems and methods embodied herein may be employed during any one or more of the stages of the production and service method 1630. For example, components or subassemblies corresponding to production process may be fabricated or manufactured in a manner similar to components or subassemblies produced while the aircraft 1650 is in service. Also, one or more apparatus embodiments, method embodiments, or a combination thereof may be utilized during the production stages 1632 and 1634, for example, by substantially expediting assembly of or reducing the cost of an aircraft 1650. Similarly, one or more of apparatus embodiments, method embodiments, or a combination thereof may be utilized while the aircraft 1650 is in service, for example and without limitation, to maintenance and service 1644.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. An apparatus for fabricating a susceptor coil assembly ribbon, the apparatus comprising:
    a tensioning section configured to provide a predetermined amount of tension to a plurality of susceptor coil assemblies;
    a collimating section configured to receive the plurality of susceptor coil assemblies from the tensioning section and configured to align the plurality of susceptor coil assemblies, wherein the collimating section comprises a plurality of guide tubes, each guide tube of the plurality of guide tubes being configured to receive a susceptor coil assembly of the plurality of susceptor coil assemblies, and wherein the collimating section comprises a rotatable aligning member comprising a plurality of grooves that are configured to align the plurality of susceptor coil assemblies;
    a first roller and a second roller configured to receive the plurality of susceptor coil assemblies aligned by the collimating section and configured to impale the plurality of susceptor coil assemblies into a matrix material so as to fabricate a susceptor coil assembly ribbon;
    a face plate coupled to the first roller such that the first roller can rotate with respect to the face plate;
    an adjusting plate coupled to the second roller such that the second roller can rotate with respect to the adjusting plate, the adjusting plate also being slidably coupled to the face plate;
    an adjustment screw configured to be turned to adjust a distance between a first rotation axis of the first roller and a second rotation axis of the second roller; and
    a third roller, wherein the face plate is rotatable about the first rotation axis to adjust a tension exerted between the second roller and the third roller.

2. The apparatus of claim 1, further comprising
    a take up section configured for receiving the susceptor coil assembly ribbon and winding the susceptor coil assembly ribbon onto a take up spool.

3. The apparatus of claim 2, wherein the take up section comprises:
    a programmable drive that is programmable to operate a motor, the motor being operable to pull the plurality of susceptor coil assemblies from the tensioning section through the first roller and the second roller.

4. The apparatus of claim 1,
    wherein the tensioning section comprises a plurality of spools, wherein each of the plurality of spools is configured to be wound with one susceptor coil assembly of the plurality of susceptor coil assemblies.

5. The apparatus of claim 4 wherein, at least one spool of the plurality of spools is mounted to an adjustable drag member.

6. The apparatus of claim 5, wherein the adjustable drag member comprises a slip-clutch mechanism,
    wherein the slip-clutch mechanism is configured to allow at least one susceptor coil assembly of the plurality of susceptor coil assemblies wound on the spool to slip as the plurality of susceptor coil assemblies are pulled from the tensioning section towards the first roller and the second roller.

7. The apparatus of claim 1 further comprising at least one matrix material source.

8. The apparatus of claim 1, wherein the first roller and the second roller are configured to impale the plurality of susceptor coil assemblies into at least one layer of the matrix material so as to fabricate the susceptor coil assembly ribbon.

9. The apparatus of claim 1, further comprising a slitting section configured to receive the susceptor coil assembly ribbon from the first roller and the second roller and slit the susceptor coil assembly ribbon to a desired width.

10. The apparatus of claim 1, further comprising an arch structure, wherein the plurality of guide tubes pass through respective holes of the arch structure.

11. The apparatus of claim 10, wherein the plurality of guide tubes are fixedly attached to the arch structure.

12. The apparatus of claim 1, wherein the plurality of guide tubes comprise a material configured to reduce friction with the plurality of susceptor coil assemblies.

13. The apparatus of claim 12, wherein the material configured to reduce friction comprises polymerized tetrafluoroethylene.

14. The apparatus of claim 1, wherein the adjustment screw is configured to be turned to adjust a thickness of the susceptor coil assembly ribbon.

15. A method for fabricating a susceptor coil assembly ribbon, the method comprising:
turning an adjustment screw, thereby moving an adjusting plate with respect to a face plate and adjusting a distance between a first rotation axis of a first roller and a second rotation axis of a second roller, wherein the face plate is coupled to the first roller such that the first roller can rotate with respect to the face plate and the adjusting plate is coupled to the second roller such that the second roller can rotate with respect to the adjusting plate;
pulling a plurality of susceptor coil assemblies from a tensioning section towards a collimating section;
collimating the plurality of susceptor coil assemblies so as to align the plurality of susceptor coil assemblies using (i) a plurality of guide tubes that receive respective susceptor coil assemblies of the plurality of susceptor coil assemblies and (ii) a rotatable aligning member comprising a plurality of grooves;
impaling, using the first roller and the second roller the plurality of susceptor coil assemblies into a matrix material so as to fabricate the susceptor coil assembly ribbon; and
rotating the face plate about the first rotation axis to adjust a tension exerted between the second roller and a third roller.

16. The method of claim 15, further comprising:
receiving the susceptor coil assembly ribbon from the first roller and the second roller by a take up section comprising a take up spool, and
winding the susceptor coil assembly ribbon onto the take up spool.

17. The method of claim 15, further comprising:
utilizing a programmable drive to pull the plurality of susceptor coil assemblies from the tensioning section through the first roller and the second roller, the programmable drive being programmable to operate a motor.

18. An apparatus for fabricating a susceptor coil assembly ribbon, the apparatus comprising:
a tensioning section configured to provide tension to a plurality of susceptor coil assemblies;
a collimating section configured to receive the plurality of susceptor coil assemblies from the tensioning section and configured to align the plurality of susceptor coil assemblies;
a first roller and a second roller configured to receive the plurality of susceptor coil assemblies aligned by the collimating section and configured to impale the plurality of susceptor coil assemblies into a matrix material so as to fabricate a susceptor coil assembly ribbon;
a face plate coupled to the first roller such that the first roller can rotate with respect to the face plate;
an adjusting plate coupled to the second roller such that the second roller can rotate with respect to the adjusting plate, the adjusting plate also being slidably coupled to the face plate;
an adjustment screw configured to be turned to adjust a distance between a first rotation axis of the first roller and a second rotation axis of the second roller; and
a third roller, wherein the face plate is rotatable about the first rotation axis to adjust a tension exerted between the second roller and the third roller.

19. The apparatus of claim 18, wherein the tensioning section comprises a plurality of spools, wherein each of the plurality of spools is configured to be wound with one susceptor coil assembly of the plurality of susceptor coil assemblies.

20. The apparatus of claim 19, wherein at least one spool of the plurality of spools is mounted to an adjustable drag member.

* * * * *